Nov. 7, 1939.  T. M. AVERY  2,179,464
BAG MANUFACTURE
Filed July 17, 1937   17 Sheets-Sheet 1
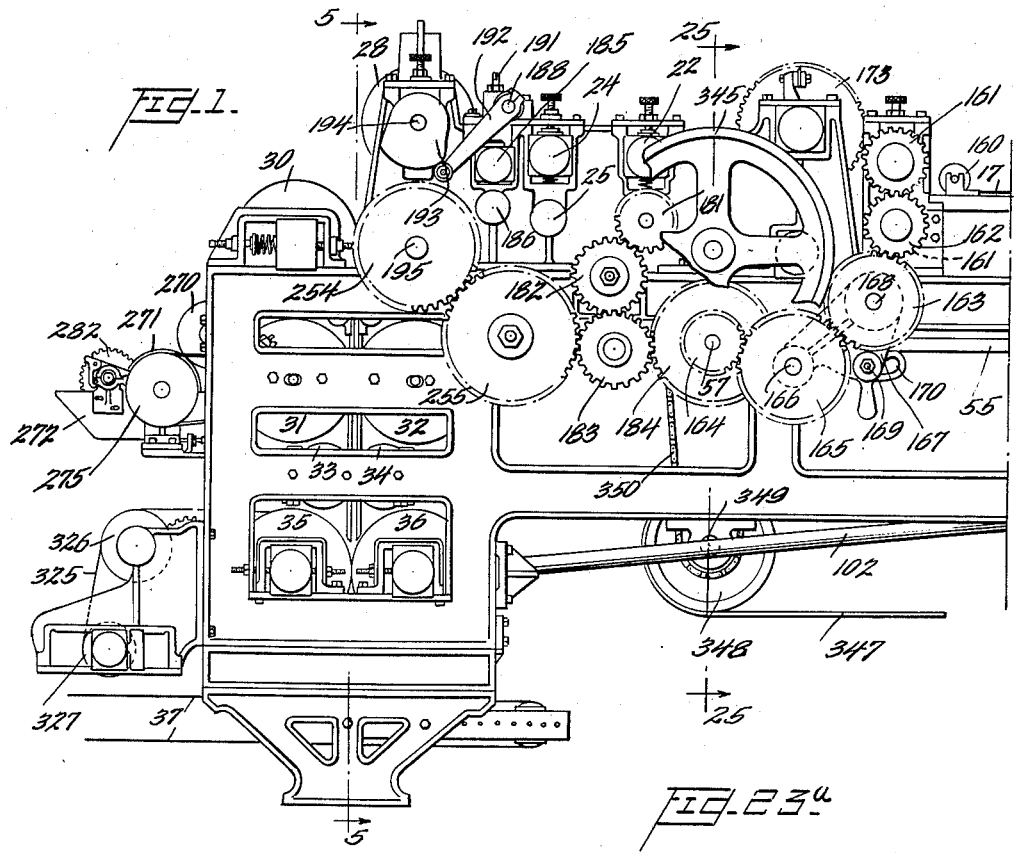
FIG. 1.
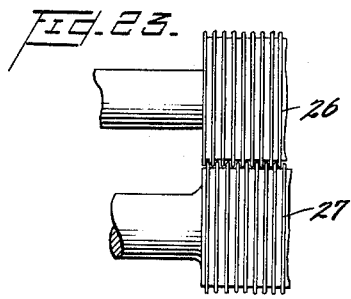
FIG. 23.
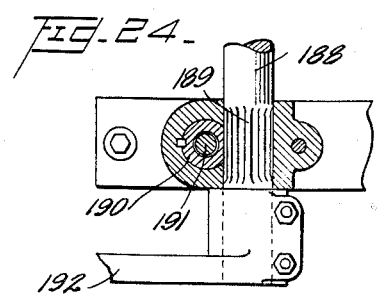
FIG. 24.
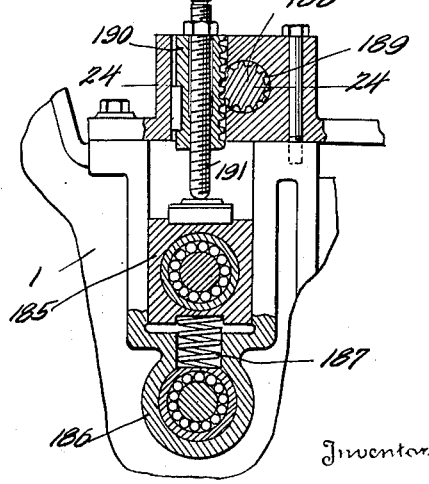
FIG. 23ᵃ.
Inventor,
True M. Avery
By Norris & Bateman
Attorneys Nov. 7, 1939.  T. M. AVERY  2,179,464
BAG MANUFACTURE
Filed July 17, 1937   17 Sheets-Sheet 2
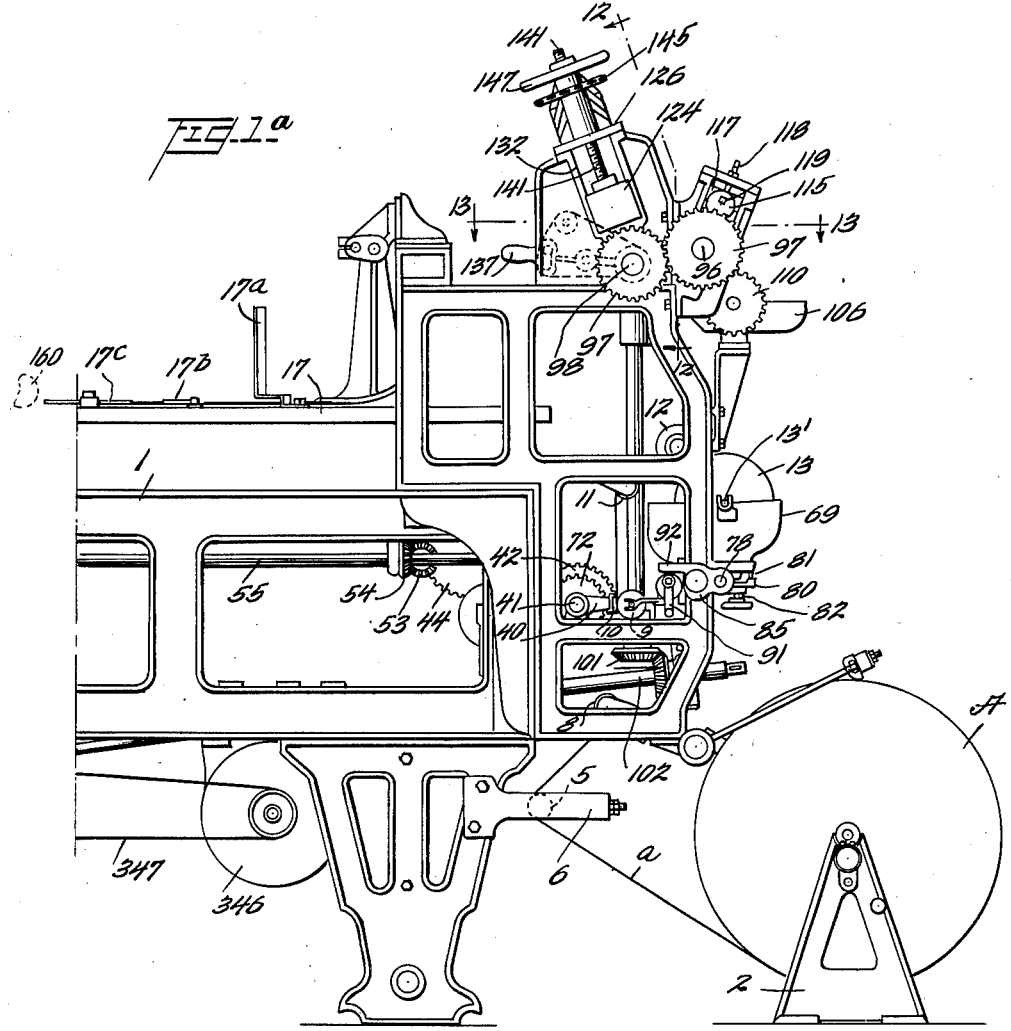
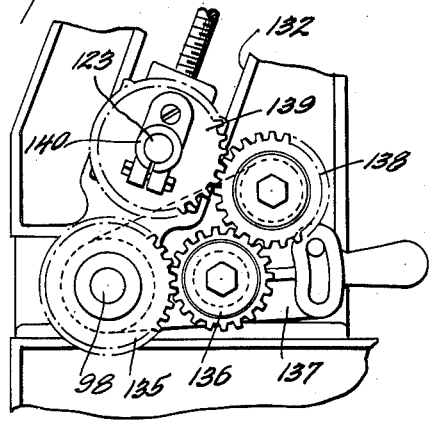
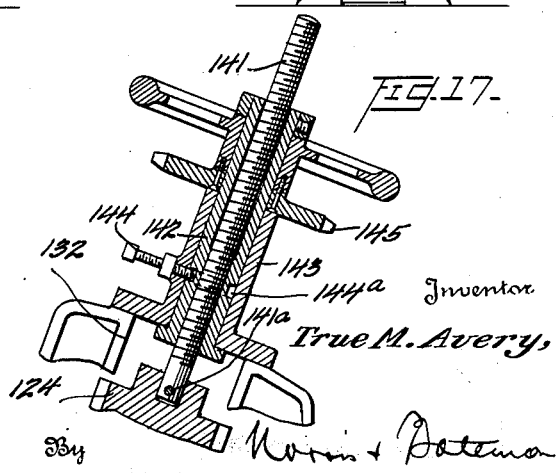

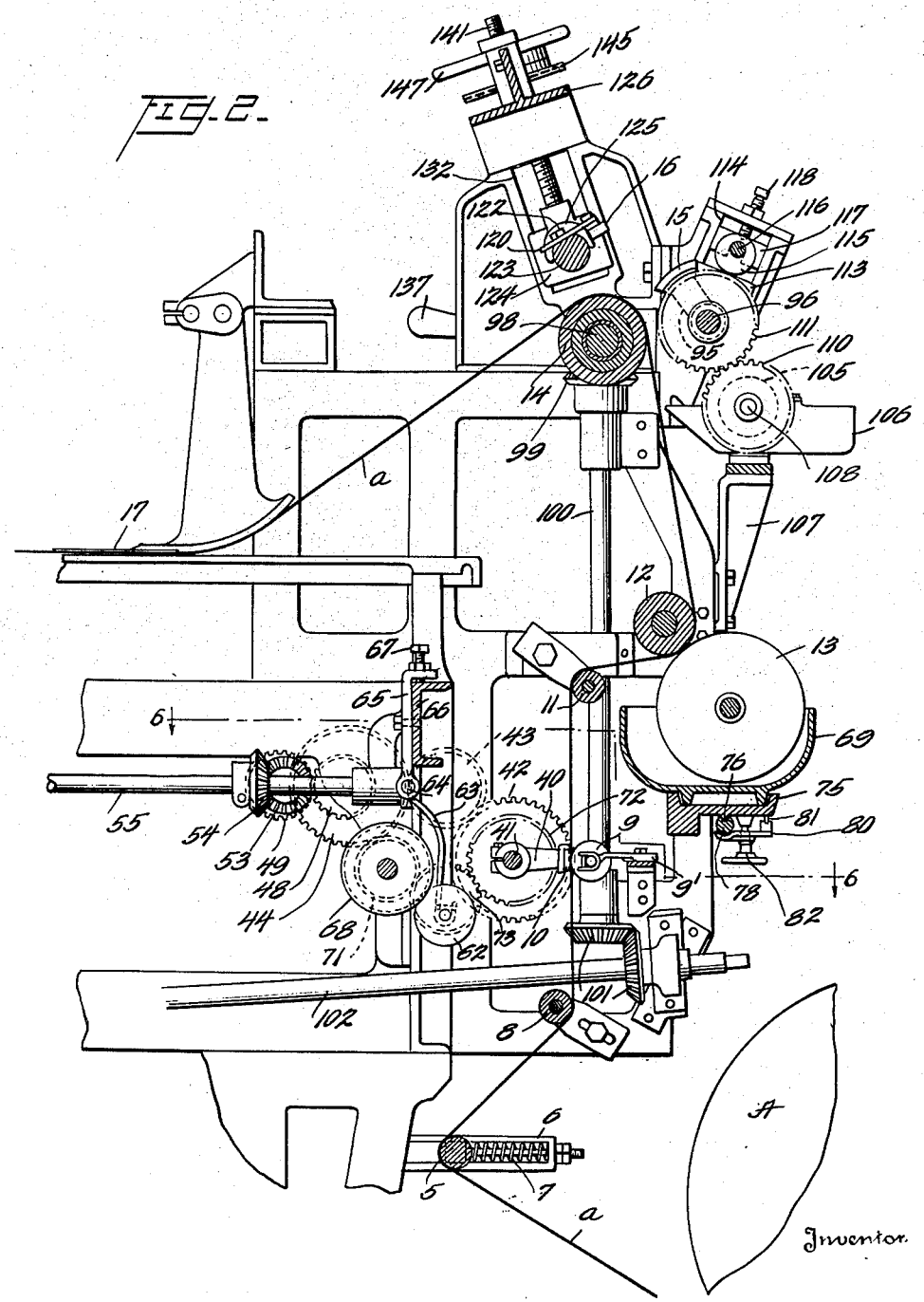

Nov. 7, 1939.　　T. M. AVERY　　2,179,464
BAG MANUFACTURE
Filed July 17, 1937　　17 Sheets-Sheet 4
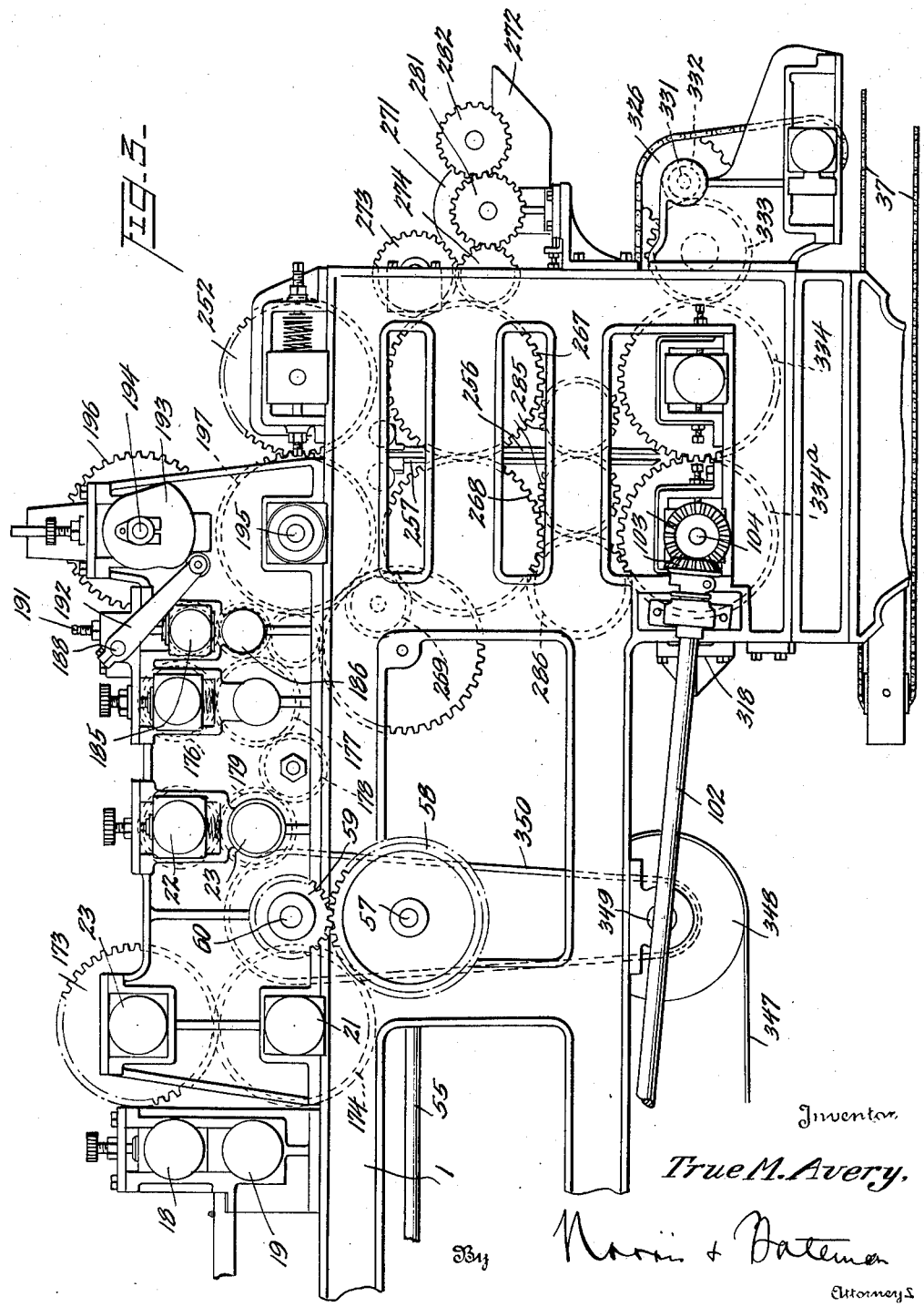

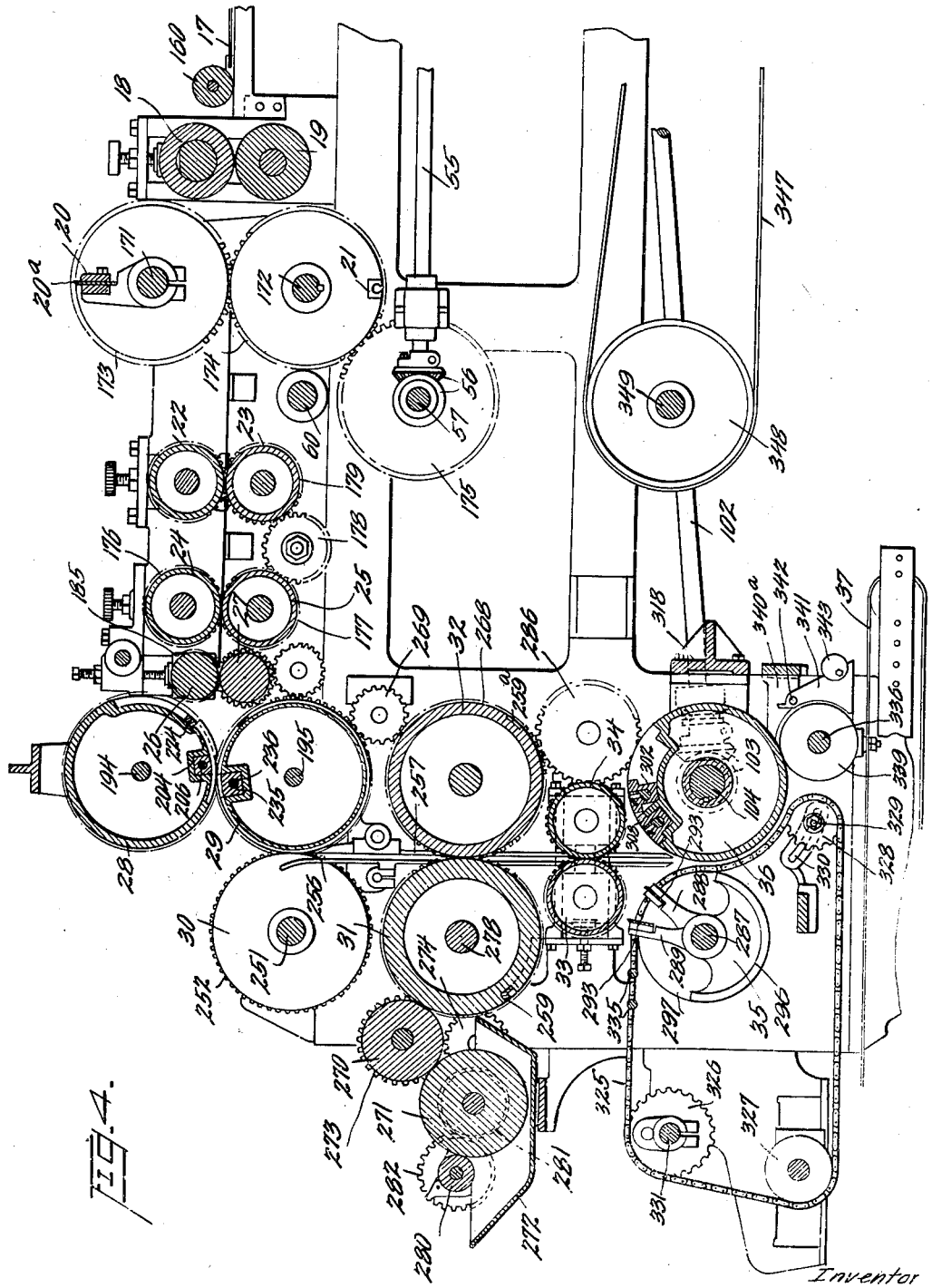

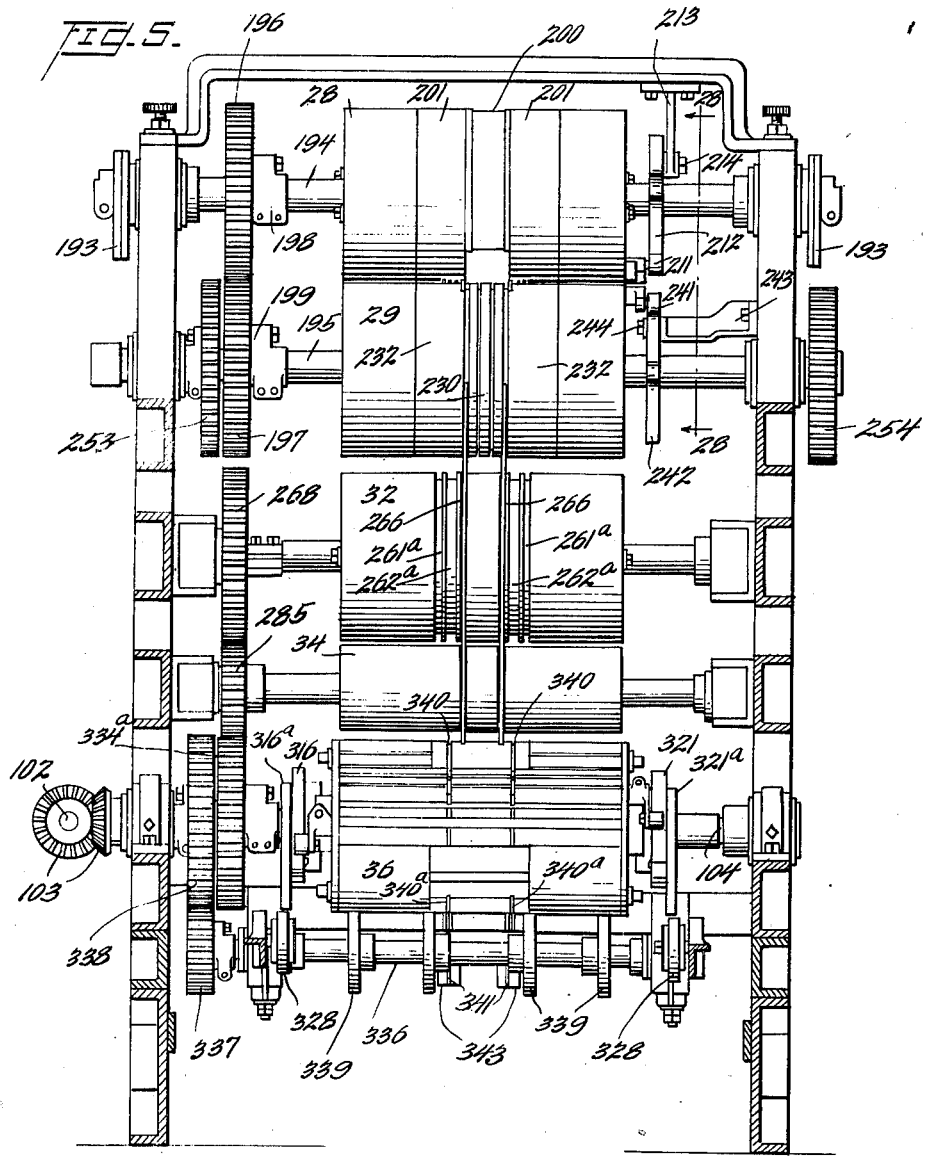

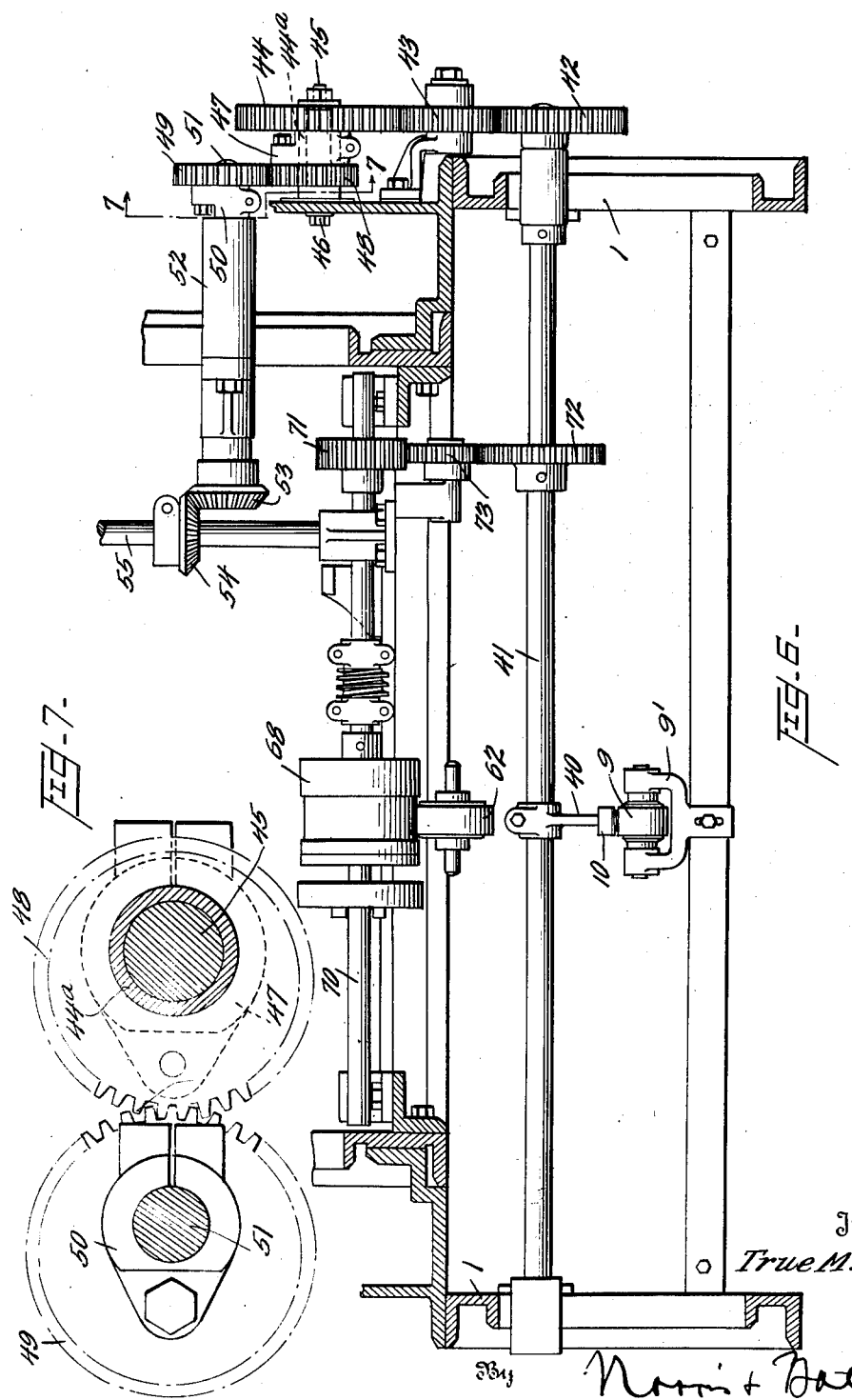

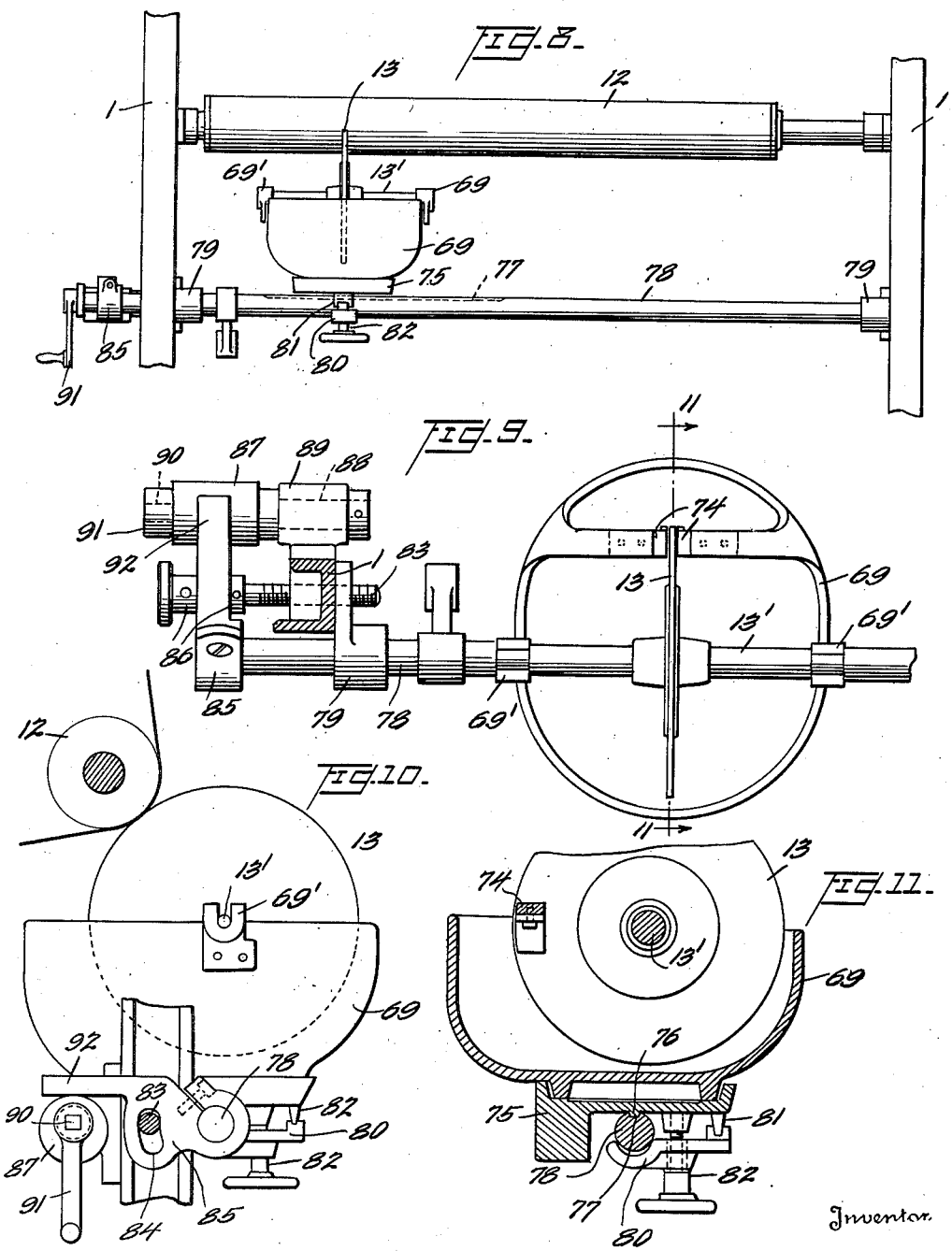

Nov. 7, 1939.  T. M. AVERY  2,179,464
BAG MANUFACTURE
Filed July 17, 1937  17 Sheets-Sheet 9
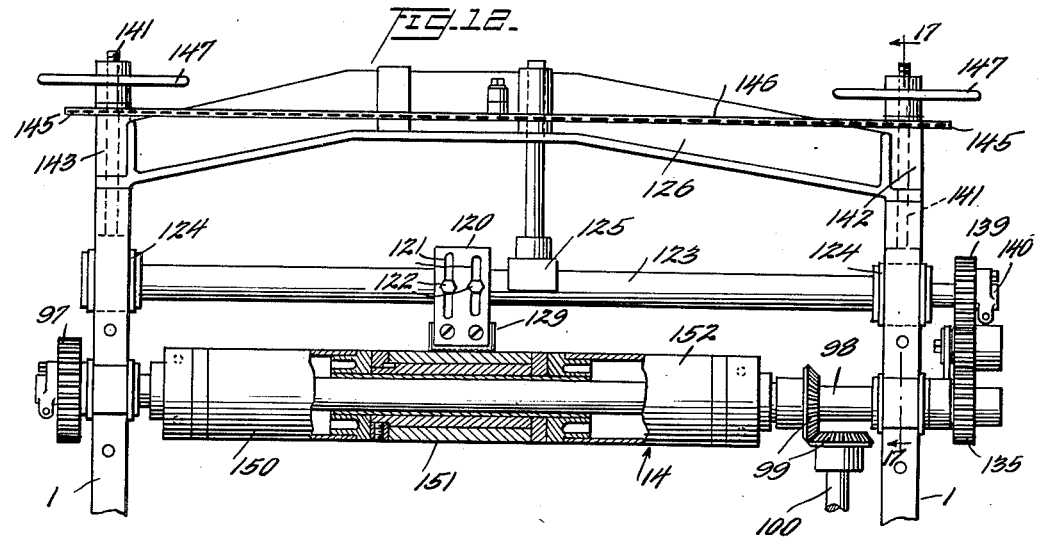
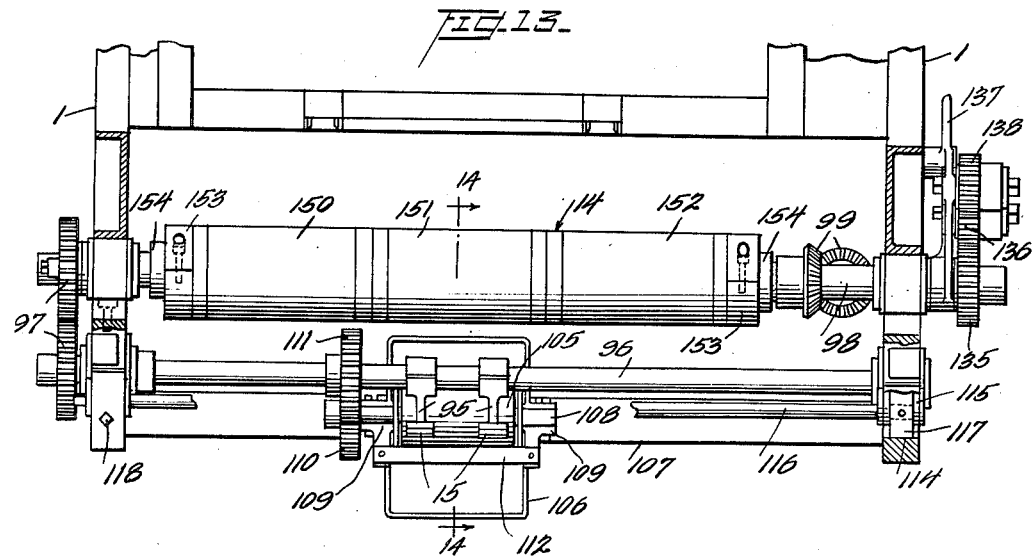
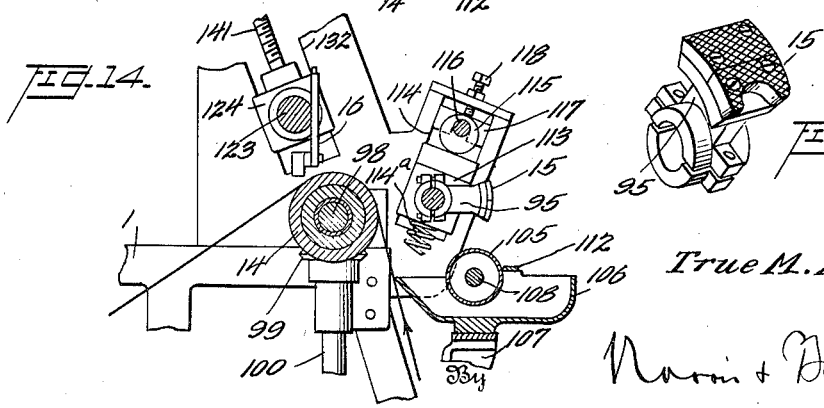
Inventor
True M. Avery

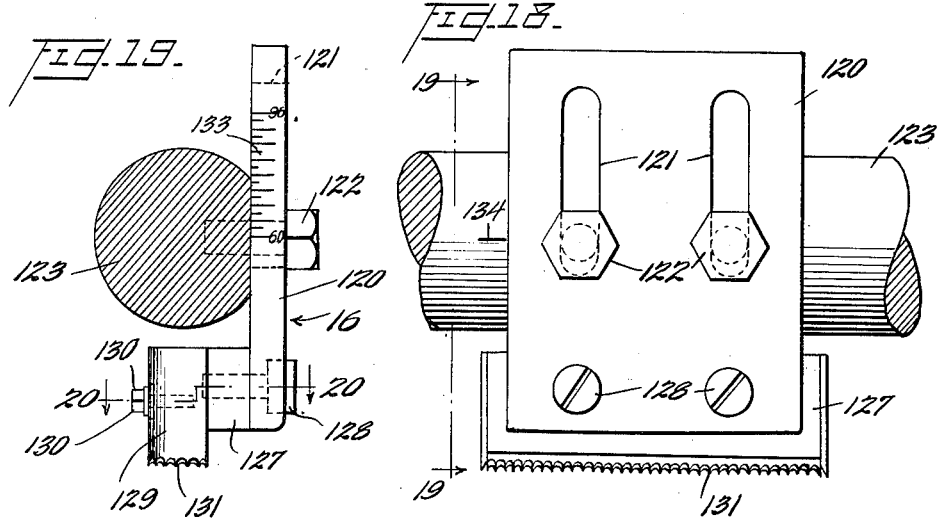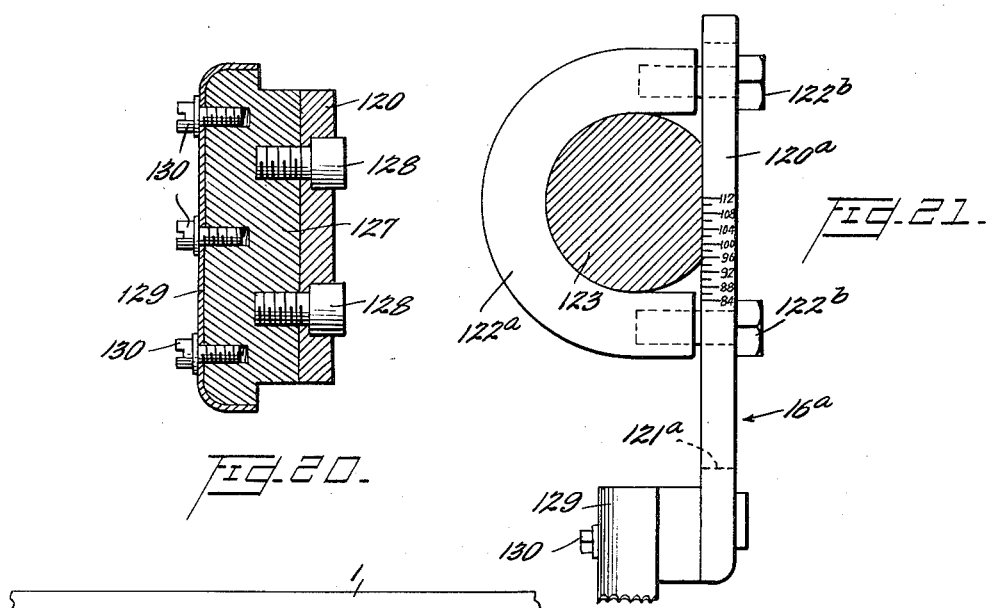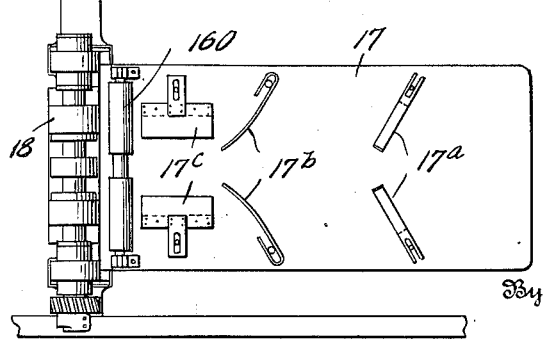

Nov. 7, 1939.  T. M. AVERY  2,179,464
BAG MANUFACTURE
Filed July 17, 1937  17 Sheets-Sheet 11
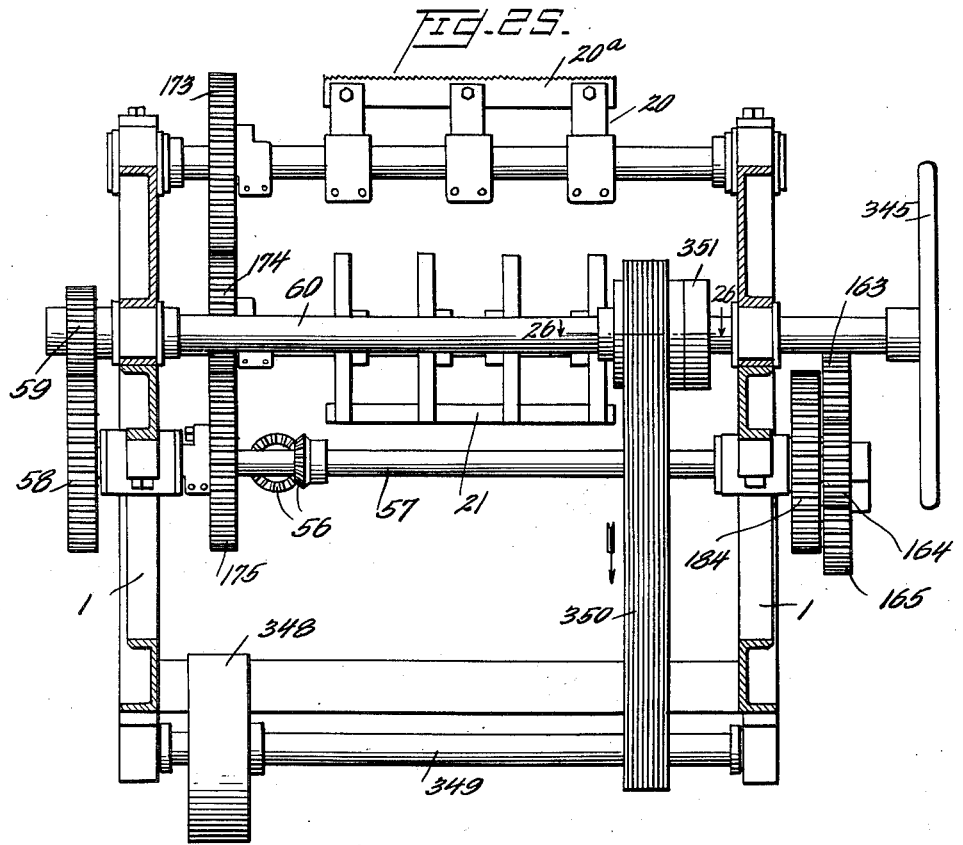
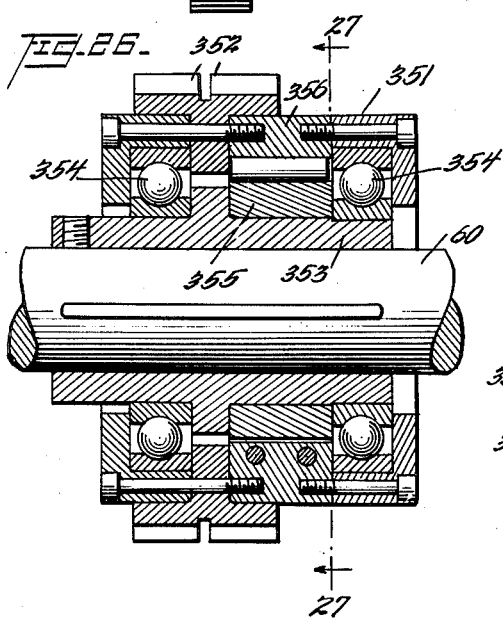
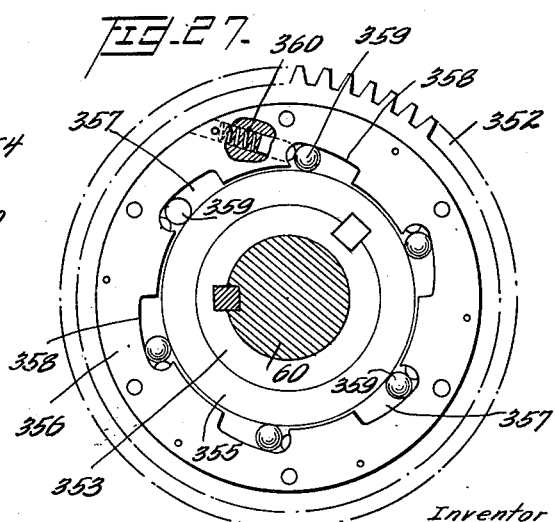
Inventor
True M. Avery Nov. 7, 1939.   T. M. AVERY   2,179,464
BAG MANUFACTURE
Filed July 17, 1937   17 Sheets-Sheet 12
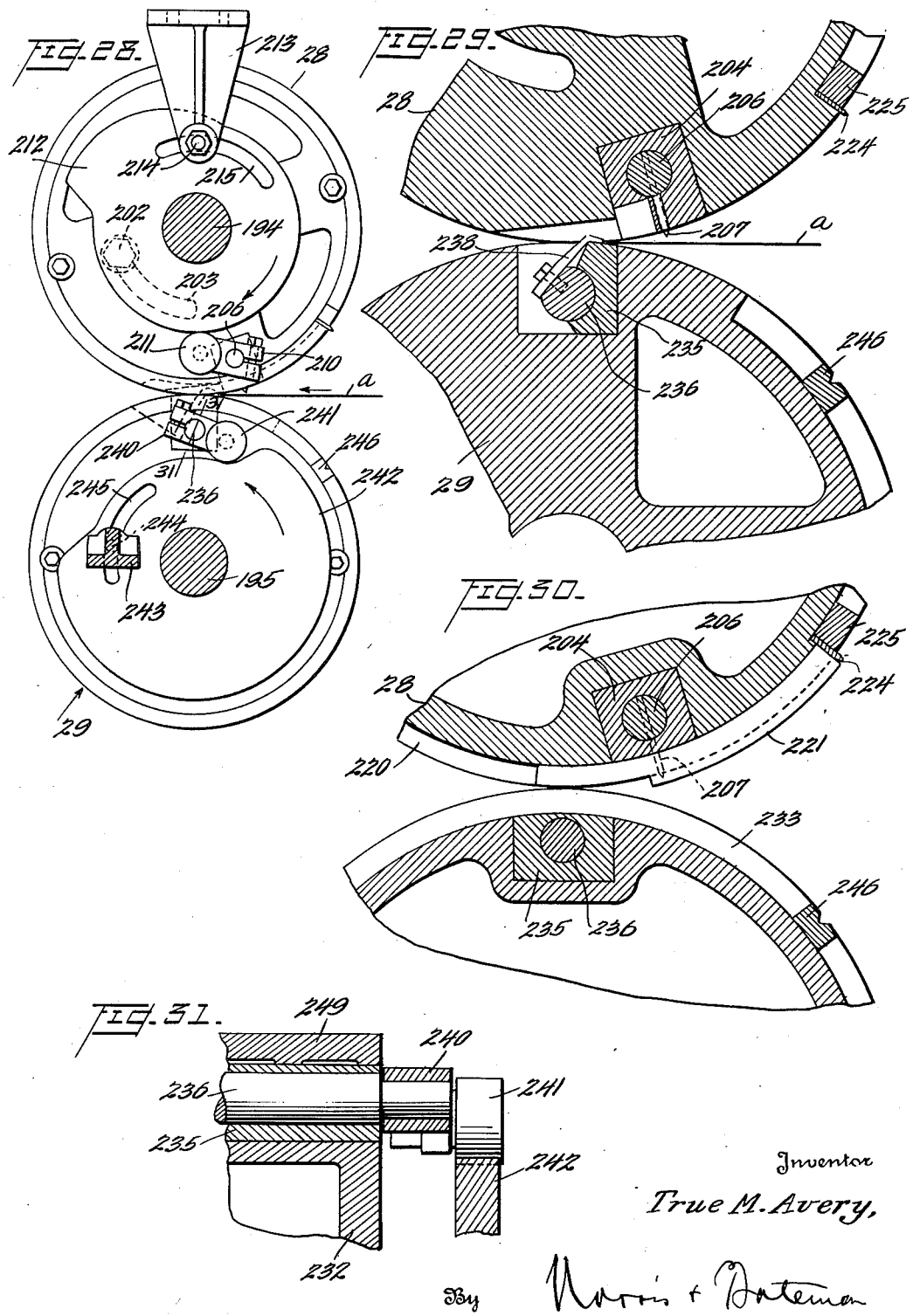

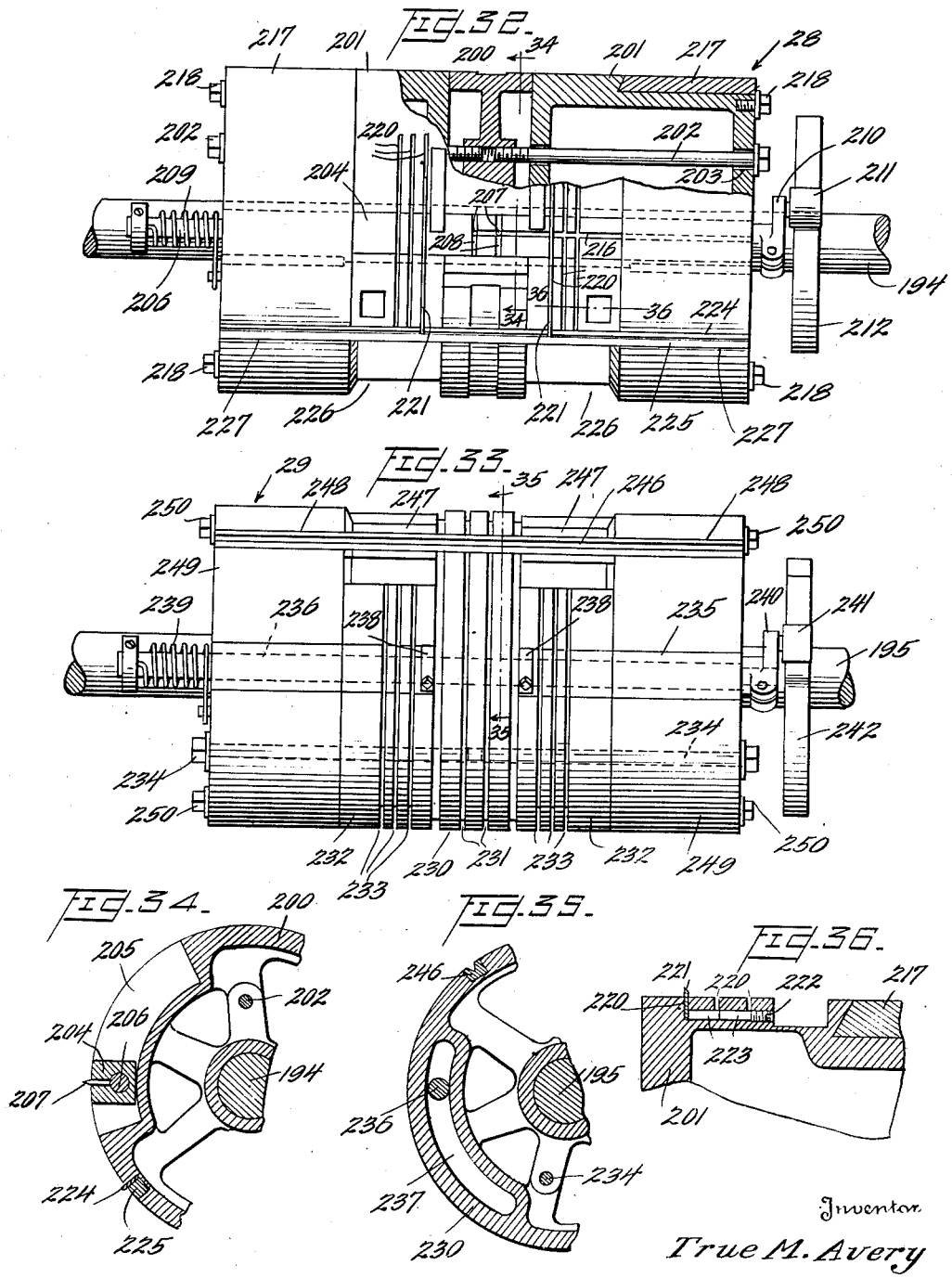

Nov. 7, 1939.　　　T. M. AVERY　　　2,179,464
BAG MANUFACTURE
Filed July 17, 1937　　　17 Sheets-Sheet 14
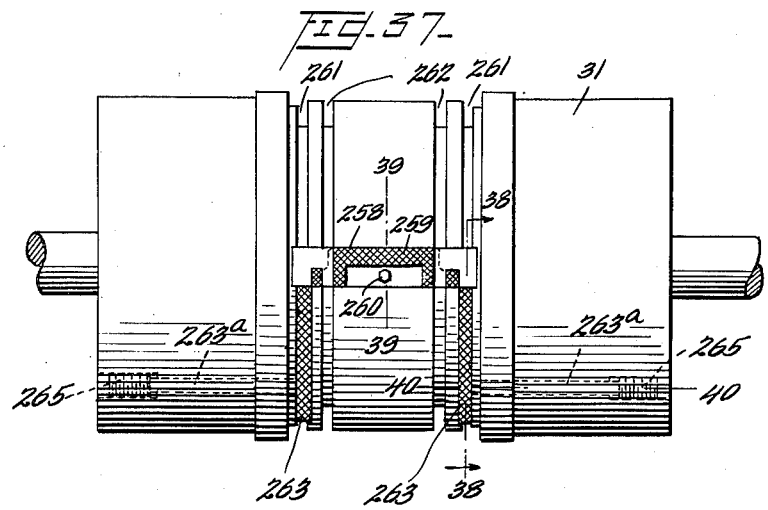
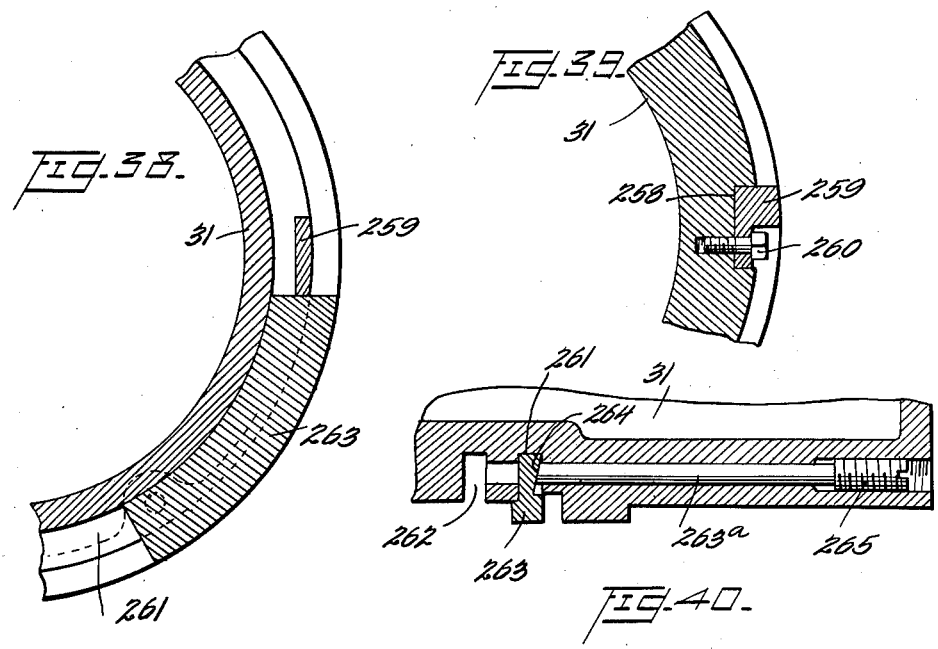
Inventor
True M. Avery
By (signature)
Attorneys

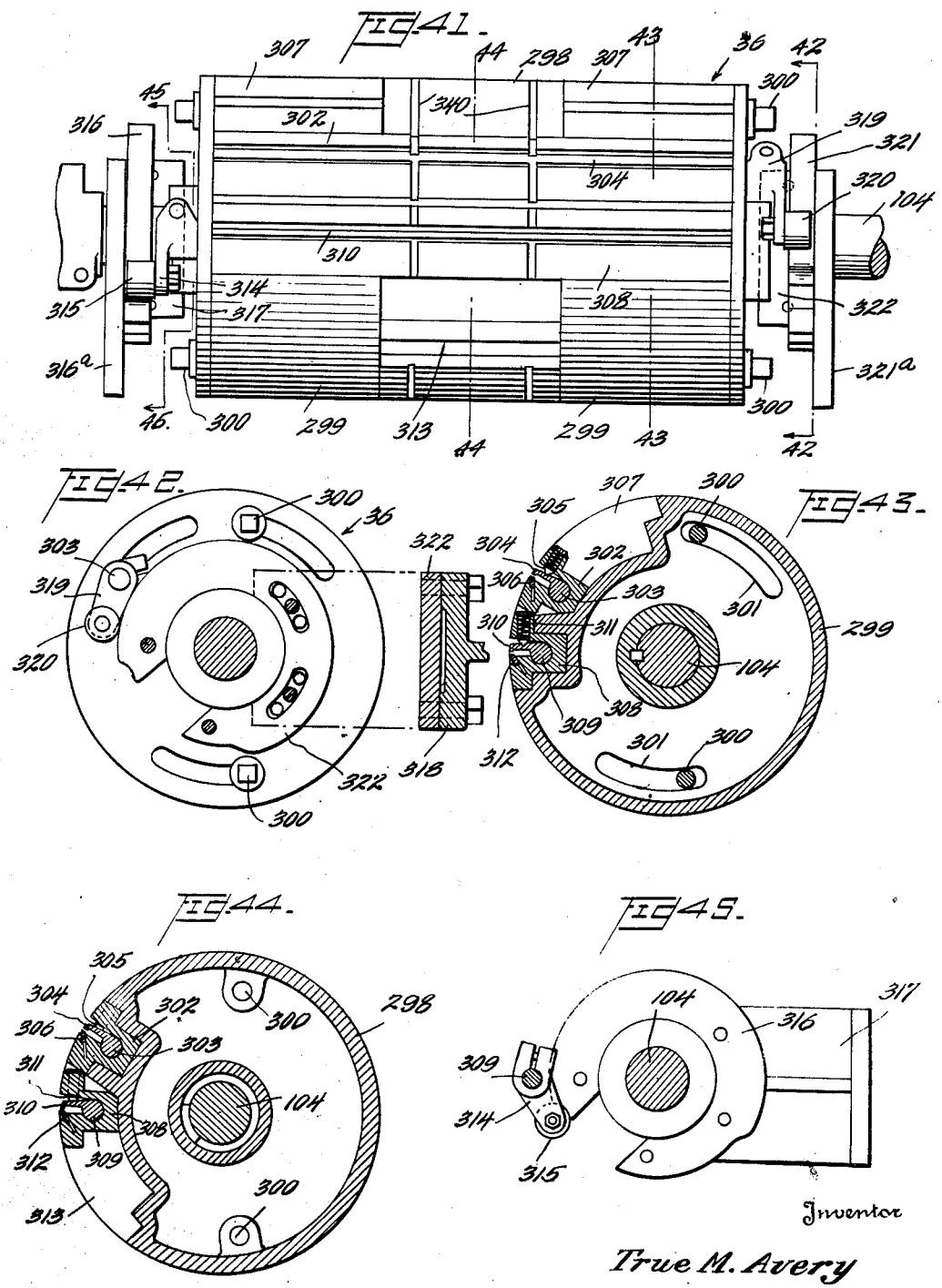

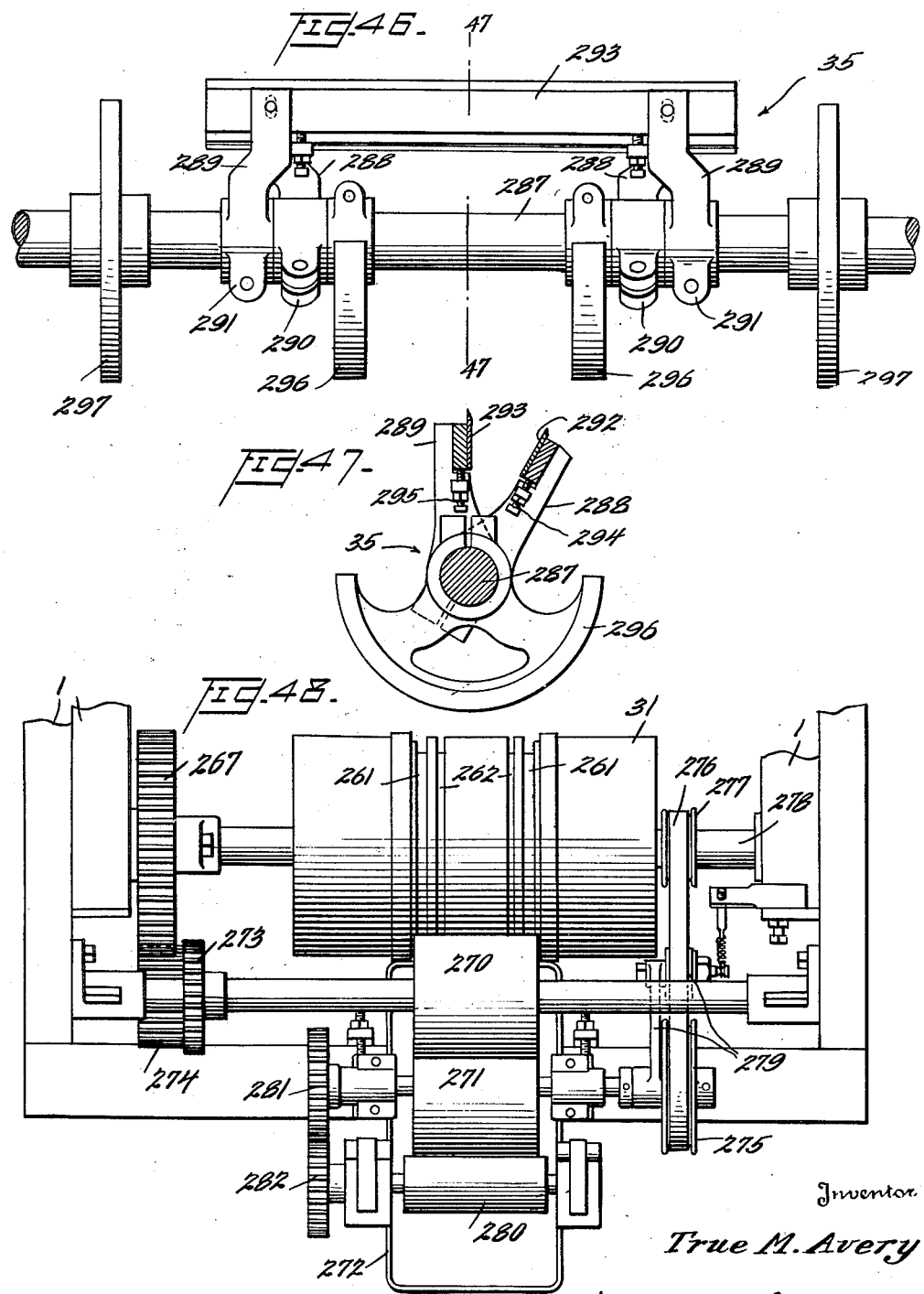

Nov. 7, 1939.　　　　T. M. AVERY　　　　2,179,464
BAG MANUFACTURE
Filed July 17, 1937　　　17 Sheets-Sheet 17
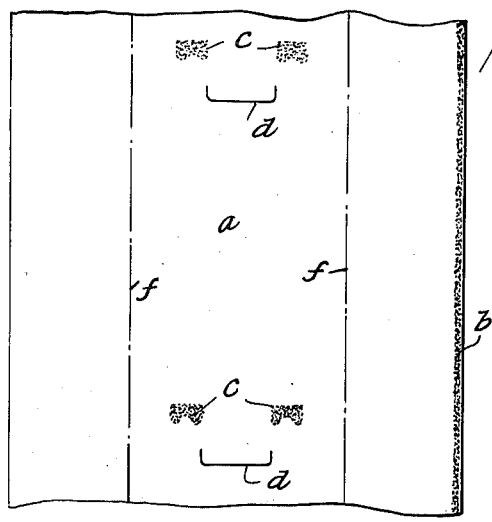
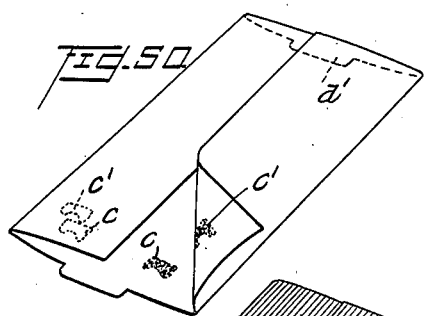
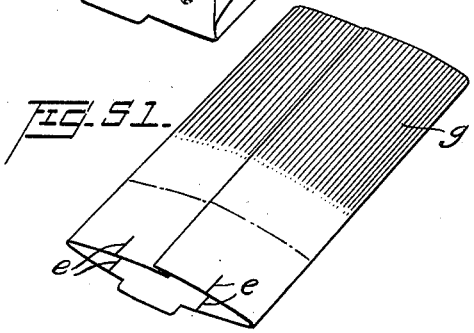
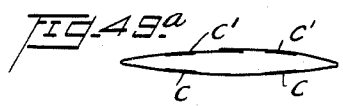
Inventor
True M. Avery,
By Norris & Bateman
Attorneys Patented Nov. 7, 1939

2,179,464

UNITED STATES PATENT OFFICE 2,179,464

BAG MANUFACTURE

True M. Avery, Glens Falls, N. Y., assignor to Union Bag & Paper Corporation, Hudson Falls, N. Y., a corporation of New Jersey Application July 17, 1937, Serial No. 154,296

20 Claims. (Cl. 93—14)

The present invention relates to improvements in the manufacture of paper bags according to which a web of paper fed from a roll or the like is provided along one edge with a line of paste after which the web is fed past a former over which it is folded to form a bag tube having a longitudinal seam, the bag tube, during its further advance, being severed into bag lengths the leading ends of which are slit longitudinally to form bottom flaps and then opened into substantially a "diamond" fold to receive paste, after which the portion of the bag length thus pasted is folded to form a bag bottom of the "satchel" type.

One of the primary objects of the present invention is to provide a novel and improved method and means for applying paste or other adhesive to those portions of the web which, in the completed bags, will be located at the ends of the slits, so that when the bottom folds are made to close the bag bottom, the bottom flaps will be pasted together at the ends of the slits, thereby rendering the bottom of the bag sift-proof and also reenforcing the bag bottom against tearing or splitting beyond the ends of the slits.

Another object of the invention is to provide novel and improved means, in a machine for making bags of this class, for cutting the travelling web at points adjacent to the lines on which the bag tube is subsequently severed, to form a thumb hole at the mouth of the completed bag which provides a lip to facilitate the opening of the bag, the thumb hole cutting means being adjustable to accommodate it to different speeds of travel of the web according to different bag lengths.

Another object is to provide simple and effective means for cutting off the bag tube to form the bag lengths, the tube being cut off on lines which join the previously made cut for the thumb hole, thereby completing the cut-off without severing the tab formed in making the cut for the thumb hole.

Another object of the invention is to provide novel and improved means for mounting the longitudinal seam paste roll whereby the same may be readily thrown out of operative relation with the web when desired, as for example, while the machine is being adjusted.

Another object of the invention is to provide novel and improved means for applying paste to the open flaps which are to close the bag bottom, whereby the paste will be applied efficiently to effectively secure the bottom flaps.

Further objects of the invention are to provide improved means for slitting and opening the bottom flaps to receive the paste and for closing such flaps, and for delivering the finished bags from the machine, and to provide other improvements as will hereinafter appear.

To these and other ends, the invention consists in certain improvements and combinations and arrangements of parts all as will be hereinafter described, the features of novelty being pointed out more particularly in the claims at the end of this specification.

In the accompanying drawings:

Figures 1 and 1a collectively show in side elevation a bag machine constructed in accordance with the present invention;

Figure 2 is a vertical section, on an enlarged scale, taken through the portion of the machine shown in Fig. 1a;

Figure 3 is an elevation of the portion of the machine shown in Fig. 1 but viewed from the opposite side of the machine;

Figure 4 is a vertical section, on an enlarged scale, taken through the portion of the machine shown in Fig. 1;

Figure 5 is a transverse vertical section taken on the line 5—5 in Fig. 1;

Figure 6 is a horizontal section, on an enlarged scale, taken on the line 6—6 in Fig. 2;

Figure 7 is a detail vertical section, taken on the line 7—7 in Fig. 6;

Figure 8 is an end elevation on an enlarged scale, of a portion of the machine shown in Fig. 2 as viewed from the right, showing the longitudinal seam paster;

Figure 9 is a top plan view, on an enlarged scale, of a portion of the longitudinal seam paster as shown in Fig. 8;

Figure 10 is an end elevation of the longitudinal seam paster shown in Fig. 9, as viewed from the left in that figure;

Figure 11 is a vertical section taken on the line 11—11 in Fig. 9;

Figure 12 is a section, on an enlarged scale, taken on the line 12—12 in Fig. 1a, showing the thumb hole cutter;

Figure 13 is a horizontal section, on an enlarged scale, taken on the line 13—13 in Fig. 1a, showing the paste spot applying mechanism;

Figure 14 is a vertical section taken on the line 14—14 in Fig. 13;

Figure 15 is a detail perspective view of one of the paste spot applying members;

Figure 16 is a detail view, on an enlarged scale, of the driving gears for the thumb hole cutter as viewed from the right in Fig. 12;

Figure 17 is a vertical section on an enlarged scale, taken on the line 17—17 in Fig. 12, showing one of the adjusting screws for the thumb hole cutter;

Figure 18 is a view in elevation and on an enlarged scale, of the thumb hole cutter;

Figure 19 is a section taken on the line 19—19 in Fig. 18;

Figure 20 is a section taken on the line 20—20 in Fig. 19;

Figure 21 is a view similar to Fig. 19 but showing a modified form of thumb hole cutter;

Figure 22 is a top plan of the table of the machine showing the folders for folding the web into a tube;

Figure 23 is a detail view of portions of the corrugating rolls;

Figure 23a is a vertical section through the bearings and adjusting and controlling means at one end of the corrugating rolls;

Figure 24 is a detail section taken on the line 24—24 in Fig. 23a;

Figure 25 is a vertical section, on an enlarged scale, taken on the line 25—25 in Fig. 1;

Figure 26 is a detail section, on an enlarged scale, taken on the line 26—26 in Fig. 25, showing the roller clutch for driving the machine;

Figure 27 is a section through the driving clutch, taken on the line 27—27 in Fig. 26;

Figure 28 is a vertical section, on an enlarged scale, taken on the line 28—28 in Fig. 5 showing the bag bottom opening rolls;

Figure 29 is a detail sectional view, on an enlarged scale, showing the gripping and creasing members on the opening rolls;

Figure 30 is a detail sectional view similar to Fig. 29 but showing one of the slitting blades and cooperative groove in the opening rolls;

Figure 31 is a detail section on an enlarged scale, taken on the line 31—31 in Fig. 28, showing the roller and a portion of the cam for controlling the gripper of the lower opening roll;

Figure 32 is an elevation, partly in section, of the upper opening roll;

Figure 33 is an elevation of the lower opening roll;

Figure 34 is a detail section taken on the line 34—34 in Fig. 32;

Figure 35 is a detail section taken on the line 35—35 in Fig. 33;

Figure 36 is a detail section taken on the line 36—36 in Fig. 32;

Figure 37 is an elevation, on an enlarged scale, of the bag bottom pasting roll;

Figure 38 is a detail section on an enlarged scale, taken on the line 38—38 in Fig. 37;

Figure 39 is a detail section on an enlarged scale, taken on the line 39—39 in Fig. 37;

Figure 40 is a detail view on an enlarged scale, taken on the line 40—40 in Fig. 37;

Figure 41 is an elevation, of one of the creasers;

Figure 42 is a section taken on the line 42—42 in Fig. 41;

Figure 43 is a section taken on the line 43—43 in Fig. 41;

Figure 44 is a detail section taken on the line 44—44 in Fig. 41;

Figure 45 is a detail section taken on the line 45—45 in Fig. 41;

Figure 46 is a view in elevation of the cooperating creaser;

Figure 47 is a section taken on the line 47—47 in Fig. 46;

Figure 48 is a top plan view of the paste applying mechanism for the bag bottom pasting roll;

Figure 49 is a view of a portion of the paper web, showing the manner in which the line of paste for the longitudinal seam and the spots of paste at the ends of the slits are applied thereto;

Figure 49a represents a transverse section through the bag tube, showing the paste spots on the inner surfaces of the upper and lower walls thereof;

Figure 50 is a perspective view of a section of the bag tube formed by folding the web, illustrating the manner in which paste from the paste spots initially applied to the portions of the web which form one side of the tube is applied thereby to the opposite side of the tube;

Figure 51 is a perspective view of one of the bag lengths after it has been creased and slit;

Figure 52 shows one of the bag lengths or sections after the bottom thereof has been opened and pasted;

Figure 53 is a longitudinal section, on an enlarged scale, taken on the line 53—53 in Fig. 52 and Figure 54 is a view similar to Fig. 53 but showing the bottom of the bag in closed condition.

Similar parts are designated by the same reference characters in the different figures.

The bag machine, as shown in the present instance, comprises a frame having a pair of side members 1 in which the various elements of the machine are mounted, and a stand 2 for supporting a roll of paper A from which the web of paper a is fed into the machine. Referring particularly to Figs. 1 to 4 inclusive, the web passes around a guide roller 5 supported by a bracket 6 attached to the machine frame and operating under the influence of a web tensioning spring 7, and the web then passes around an idler roller 8 and between a roller 9 and a printing plate 10 which prints a trade-mark or other impression at suitable points on the web. The web then passes around a guide roller 11 and between a roller 12 and a disk 13, the latter applying a continuous line of paste or other adhesive b to the web adjacent to one of its longitudinal edges. The web then passes around a roller 14 at which point it receives at suitable intervals a pair of paste spots c from a pair of paste spot applying pads or members 15 and, while passing around the roller 14, slits d which are to form the thumb holes d' on the mouths of the bags, are formed in the web by the thumb cutter 16. From the roller 14, the web passes beneath a former 17 which may be of the kind commonly used in machines of this class and is provided with the usual folders 17a and 17b for folding the longitudinal edges of the web inwardly to form the web in a tube with the edge of the web bearing the line of paste b underneath so that the tube will be provided with a longitudinal seam. The tube is drawn beneath the folder plates 17c and from the former by a pair of continuously driven draw rolls 18 and 19, and as it is drawn from the former, it is flattened by a roller 160, thereby bringing the upper side of the tube against the lower side thereof and thus causing transferrance of paste from the spots c, c on the inner surface of the lower side to the inner surface of the upper side of the tube to provide the paste spots c', c' thereon. The tube then passes between a revolving cutter 20 and a cooperating cutter member 21 which sever the tube into bag lengths while the tube in advance of the cutter is passing between a pair of pinch rolls 22 and 23. The severed bag length then passes at increased speed between a pair of carrier rolls 24 and 25 and then between a pair of corrugating rolls 26 and 27 and then between upper and lower opening rolls 28 and 29 which open the leading ends of the bag sections and fold end portions thereof against the paste spots $c$, $c$ and $c'$, $c'$, then between the lower opening roll 29 and a coacher roll 30 and between a pair of pasting rolls 31 and 32 which apply the paste for the securing of the bottom flaps of the bag, then between a pair of carrier rolls 33 and 34 and between a pair of creasers 35 and 36 which operate on the bottom flaps to close them and complete the bag bottoms, and the completed bags are delivered between the creaser roll 36 and a flap folding roll onto a belt 37 which removes them from the machine.

Referring more particularly to Figs. 2, 6 and 7, the printing plate 10 is carried by an arm 40 which is clamped or otherwise fixed in appropriate position on a shaft 41 journalled in suitable bearings in the side members of the frame, this shaft being driven by a gear 42 fixed thereon and meshing with an idler 43, the latter meshing with a gear 44 mounted revolubly on a shaft 45 secured to the adjacent side member of the frame by a bolt 46. To the hub 44ª of the gear 44 is secured, by a clamp 47 or other suitable means, an elliptic gear 48 and this gear meshes with a companion elliptic gear 49, the latter being secured, as by a clamp 50 to a shaft 51, the latter being mounted in a bearing 52 and having a bevel gear 53 fixed thereon which meshes with a bevel gear 54 fixed on a longitudinal shaft 55, the shaft 55 being driven through a pair of bevel gears 56 from the shaft 57 and the latter being driven through gears 58 and 59 from the main drive shaft 60 (Fig. 25). By employing the elliptic gears 48 and 49 for driving the arm 40 carrying the printing plate 10, said arm will be driven at a variable speed during its rotation, and by adjusting the gears 48 and 49 into suitable angular positions about the hub of the gear 44 and the shaft 51 and securing them in such adjusted positions by the clamps 47 and 50, the speed of travel of the printing plate 10 at the moment it engages the travelling web can be adjusted to conform with the speed of the web although the web may travel at different speeds through the machine to conform with the making of bags of different lengths. The arm 40 carrying the printing plate 10 makes one revolution corresponding to the passage of each bag length, it printing upon one side of the web while the opposite side of the web is supported by the freely revoluble roller 9 supported by a bracket 9' mounted adjustably in the machine frame. The printing plate 10 is supplied with ink at each revolution thereof by a roller 62 (Fig. 2) which is supported by an arm 63, the latter being suspended by a pivot 64 from a bracket 65, the latter being supported on a cross member 66 of the frame by a set screw 67 which affords means of adjustment of the roller 62 vertically to bring it into the path of the revolving printing plate. The roller 62 is supplied with ink from a cooperating ink fountain roller 68 which may contain a supply of ink. The ink fountain roller 68 is mounted on a shaft 70 which is driven through the gear 71 fixed thereon, the gear 72 fixed on the shaft 41 and an idler gear 73.

The longitudinal seam paste roll 13 (Figs. 2 and 8 to 11 inclusive), is fixed on a shaft 13' journalled in bearings 69' on a paste dish 69, this roll revolving idly by frictional contact with the margin of the paper web as it passes between this roll and the cooperating roll 12. The paste dish 69, into which the roll 13 dips to receive paste therefrom, is provided with a pair of wipers 74 between which the peripheral portion of the roll 13 passes whereby excess paste will be removed therefrom, and the paste dish is mounted on a base 75 which is provided on its underside with a rib or key 76 which rests in and is movable longitudinally in a keyway 77 formed in the upper side of a supporting shaft 78, the latter being mounted in bearings 79 in the side frame members 1, the shaft 78 being slidable axially and also rotatable in said bearings. The base 75, which may be adjusted longitudinally along the shaft 78 to accommodate it to webs of different widths for bags of different sizes, is clamped in adjusted position on said shaft by a clamping member 80 one end of which engages the underside of the shaft 78 and the other end of which bears on a fulcrum lug 81 depending from the base, a screw 82 being provided for clamping the base 75 rigidly on the shaft 78. A fine adjustment of the paste roll 13 with respect to the marginal edge of the web is provided by a screw 83 which is threaded in the adjacent side frame member 1 and extends through a slot 84 in an arm 85, the latter being clamped or otherwise fixed to the outer end of the shaft 78, the screw having thrust collars 86 thereon which bear against the opposite sides of the arm 85 so that rotation of the screw in one or the other direction will shift the shaft 78 longitudinally and thereby adjust the paste roll 13 toward or from the longitudinal edge of the web. The present invention provides means whereby the paste roll 13 may be easily and quickly thrown out of operative position with respect to the web, such means comprising a cam 87 mounted on a shaft 88, the latter being mounted rotatably in a bearing 89 on the adjacent side frame member 1, this cam having a squared or other angular portion 90 thereon to receive a crank or wrench 91 for rotating it, and the arm 85 fixed to the shaft 78 has an extension 92 which rests by gravity on the upper side of the cam. When the cam is swung into the position shown in Fig. 10, the paste dish 69 and paste roll 13 will occupy operative relation with the web passing around the roller 12 and the roll 13 will apply a line of paste for the longitudinal seam. However, should it be desired to throw the paste roll 13 out of operation, as when it becomes necessary to adjust the machine, the cam 87 is rotated by the crank 91 or other suitable means into a position opposite to that shown in Fig. 10, the cam then acting on the extension 92 to lift the arm 85 and thereby rotate the shaft 78 in a direction to swing the paste roll 13 away from the cooperating roller 12 and out of contact with the web.

As the web passes around the roller 14 it receives two spots of paste $c$, $c$ (Fig. 49) on both portions of the web which will lie substantially at the terminals of the slits $e$ (Fig. 51) which are subsequently made in the bag tube as a part of the bottom forming operation. These spots of paste are applied to the web by a pair of paste pads 15 (Figs. 2, 13, 14 and 15). These paste pads are carried on a pair of arms 95 which are clamped or otherwise adjustably fixed to a shaft 96 so that they can be set at different distances apart according to bag bottoms of different sizes. The shaft 96 is suitably journalled in the side frame members of the machine and is driven so that it makes one revolution during the passage of each portion of the web corresponding to a bag length, by gears 97 one of which is fixed to the shaft 96 and the other to a shaft 98, the latter being journalled in suitable bearings in the side frame members of the machine and extending through and forming the support for the roller 14. The shaft 98 is driven through bevel gears 99 from a vertical shaft 100, the latter in turn being driven by bevel gears 101 from a longitudinal shaft 102, the latter being driven through bevel gears 103 (Fig. 3) from the shaft 104 of the creaser roll 36. The faces of the paste pads 15, which are concentric with the axis of the shaft 96 and are preferably knurled or provided with multiple grooves so that they will hold an ample amount of paste, contact with and roll upon the surface of a fountain roller 105 which extends into and is adapted to receive paste or other adhesive from a paste tray or receptacle 106 which is mounted on a bracket 107 secured in fixed position on the frame of the machine. The shaft 108 of the paste fountain roller 105 is journalled in bearings 109 arranged at the sides of the paste tray, and the fountain roller 105 is driven so that its surface moves in the same direction as the outer surfaces of the paste pads 15 but preferably at a relatively lower speed by gears 110 and 111 of appropriate sizes and fixed respectively to the shaft 108 and the shaft 96. A doctor or scraper 112 is preferably secured to the paste tray so that it extends across it in close proximity to the periphery of the fountain roller 105, this doctor serving to distribute the paste evenly on the fountain roller and prevent lumps or excess paste from reaching the paste pads, the greater surface speed of the paste pads relatively to the surface of the fountain roller insuring the picking up of an ample amount of paste therefrom. The surfaces of the paste pads 15 travel in a circular path which not only brings them into position to receive paste from the fountain roller at each revolution of the shaft 96, but the paste pads, after receiving paste from the fountain roller, contact with and also move with the web a passing over the roller 14, thereby applying the two spots of paste c, c to the web near its center, as shown in Fig. 49.

Means is provided for throwing the paste pads 15 out of operative relation with the web and the fountain roller 105 whenever desired, as for example, when the machine is to be adjusted. For this purpose, the shaft 96 carrying the paste pads is mounted in bearings 113 which are slidable in guideways 114 provided on the respective side frame members, these guideways extending at an incline between the axes of the shafts 98 and 108 so that movement of the bearings 113 upwardly or downwardly in these guideways will carry the paste pads 15 into or out of operative relation with the fountain roller 105 and the web passing over the roller 14. A compression spring 114ª is mounted beneath each of the bearings 113 and acts to move the same upwardly, and a pair of cams 115 fixed to and connected by a shaft 116 are mounted above each of the bearings 113 and bear thereon. The shaft 116 is mounted rotatably in bearing blocks 117 which are interposed between each pair of cams and mounted to move vertically in the upper portions of the respective guides 114, and these bearing blocks are engaged at their upper sides by adjusting screws 118 mounted in the upper ends of the respective guides. One end of the shaft 116 may be provided with a squared or other wrench or crank receiving portion 119. By this arrangement, when the shaft 116 is rotated to swing the cams 115 downwardly into the position shown in Fig. 14, the shaft 96 will be lowered into its operatvie position so that during each revolution of the paste pads, their outer paste receiving surfaces will contact with the fountain roller 105 and will receive a supply of paste therefrom and will then contact with the web passing over the roller 14 and will apply paste therefrom to the web. The adjusting screws 118 enable the path of movement of the paste pads to be accurately adjusted relatively to the fountain roller 105 and the roller 14. Whenever it is desired to render the paste pads inoperative as when the machine is to be adjusted, the shaft 116 is rotated through a half revolution, thereby swinging the cams 115 upwardly or into a position opposite to that shown in Fig. 14, and the springs 114ª located beneath the respective bearings 113 will then lift the shaft 96 and the paste pads thereon so that they will not contact with the fountain roller 105 or the web passing over the roller 14. As previously stated, the paste spots c, c are applied successively to those portions of the travelling web which correspond with the bag sections which are to be subsequently made therefrom, these paste spots being applied to those regions of the web which will lie at the terminals of the slits e, e which are subsequently made in the bag tube, these paste spots being applied to the portion of the web between the lines f (Fig. 49) on which the web is subsequently folded to form it into a tube.

The thumb hole cutter 16, which is shown more particularly in Figs. 2 and 12 to 20 inclusive, comprises a plate 120 having parallel slots 121 therein to receive a pair of clamping screws 122 which are threaded into a shaft 123, the latter being journalled in suitable bearings 124 mounted in the side frame members and provided with an intermediate steadying bearing 125 which is fixed to a cross member 126 of the frame. One end of the plate 120 has a block 127 fixed thereto, as by the screws 128, and a blade 129 is fixed to the block 127 as by screws 130. The blade 129 is of a size and shape to conform with the humb hole d' which is to be provided at the mouth of the bag, as shown in Fig. 50, this blade making the cut d in the web as shown in Fig. 49. The edge of this blade projects beyond the block 127 and is preferably serrated as shown at 131. The shaft 123 and the lip cutter 16 thereon are mounted in such relation to the roller 14 that, during each revolution of the shaft 123, the serrated edge of the lip cutter will travel at the same speed at which the web travels over the roller 14 and will engage and cut the web as indicated at d in Fig. 49. In order to enable the lip cutter to be adjusted to travel at the same speed as the web when the machine is adjusted for the travel of the web at a higher or lower speed to conform with bags of different lengths, the bearings 124 in which the shaft 123 is mounted are movable in guideways 132 in the respective side members of the frame so that the shaft 123 may be set at different distances from the roller 14, and the plate 16 which carries the cutting blade is adjustable in a direction approximately radially of the shaft 123 so that it may contact with and cut the web irrespective of the different settings of the shaft 123. To facilitate the setting of the plate 120, the latter is provided with graduations 133 which are adapted to coperate with a suitable indicating mark 134 on the shaft 123, these graduations indicating the different adjustments for the plate 120 and the blade carried thereby for bag sections of different lengths. It is to be understood that when the plate 120 and the cutting blade carried thereby are adjusted in one direction or the other transversely of the shaft 123, said shaft will be correspondingly adjusted toward or from the roller 14 in order that the edge 131 of the blade will contact with and cut the web. While the speed of rotation of the shaft 123 is not altered to compensate for different speeds of travel of the web for bag sections of different lengths, such compensation is afforded by the adjustment of the plate 120 transversely of the shaft 123 whereby the cutting edge of the blade is caused to travel through a circular path of longer or shorter radius.

The shaft 123 is driven from the shaft 98 by gearing which maintains a driving connection between these shafts irrespective of the adjustments of the shaft 123 in its guides 132. As shown more particularly in Fig. 16, such gearing comprises a gear 135 which is fixed to the shaft 98, this gear meshing with an idler gear 136 which is mounted on a sector 137, the latter being pivoted to swing concentrically about the shaft 98, the idler gear 136 meshes with another idler gear 138 mounted on the sector 137, and the gear 138 meshes with a gear 139 which may be adjustably secured, as by a clamp 140, to the shaft 123. By swinging the sector 137 upwardly or downwardly about the shaft 98 as the shaft 123 is adjusted upwardly or downwardly, a driving connection is maintained between the shafts 98 and 123.

The shaft 123 is adjusted toward and from the roller 14 preferably by a pair of screws 141 each of which is secured, as by a pin 141a, in the respective bearing 124. Each screw is threaded in a sleeve 142 which is mounted revolubly in a bearing 143 secured to the respective side member of the frame above the guide 132, axial movement of the sleeve being prevented by a screw 144 which is threaded through the bearing 143 and engages in a circumferential groove 144a in the sleeve 142. Each of the sleeves 142 has a sprocket wheel 145 fixed thereto, and the sprocket wheels are connected by a sprocket chain 146, and each of the sleeves 142 is further provided with a hand wheel 147. By this arrangement, by rotating either of the hand wheels 147, both sleeves 142 will be rotated simultaneously and, acting upon the respective screws 141, will raise or lower the respective ends of the shaft 123 to equal extents.

The roller 14 with which the blade 129 cooperates, is preferably composed of sections 150, 151 and 152 each of which is loosely mounted on the shaft 98. The middle section 151 which is directly opposite to the blade 129 is preferably provided with a peripheral surface of rubber of suitable hardness to provide a backing for the web when it is cut by the blade. In order to enable different portions of the middle roller section 151 to be brought into working relation with the blade 129 after this section of the roller has become cut by the blade, the section 151 together with the sections 150 and 152 may be shifted into different positions longitudinally of the shaft 98 by changing the position of split collars 153 which may be placed between one or both ends of the roller 14 and thrust collars 154 fixed on the shaft 98, such adjustment of the roller section 151 enabling a fresh portion of its periphery to be brought into working relation with the blade 129 after other portions thereof have become cut or mutilated. The lip cutter 16a shown in Fig. 21 is similar in its construction and mode of operation to that just described, it however being secured to the shaft 123 by a pair of yokes 122a which embrace it and have screws 122b which extend through relatively longer slots 121a in the plate 120a, the latter carrying the blade 129 and being adjustable transversely of the shaft 123 and secured in its different adjusted positions by tightening of the screws 122b.

The web a, after passing over the roller 14 and receiving the paste spots c, c from the paste pads, 15 and having received the cuts d made by the lip cutter 16, passes beneath the former 17 and its longitudinal edges are folded inwardly, one beyond the other by the usual or conventional folding means commonly used in machines of this class, the folded portion of the web bearing the longitudinal paste line b lying beneath the other longitudinally folded portion of the web, and as the tube leaves the former, it passes beneath a roller 160 which presses together the opposite sides of the tube and causes transference of paste from the paste spots c, c to the other side of the tube to provide the paste spots c', c' thereon to form the longitudinal seam. The bag tube then passes between the draw rolls 18 and 19 the shafts of which are journalled in the side members of the frame, these draw rolls serving to draw the bag tube and also the web prior to its formation into a tube through the machine. The draw rolls are connected to revolve in unison by gears 161 as usual and a driving gear 162 is fixed to one of the draw rolls and meshes with a gear 163. The gear 163 is driven from the shaft 57 by a change speed gearing similar to that commonly used in machines of this class whereby the web may be caused to travel through the machine at a greater or lesser speed, according to the length of the bags being made. This change speed gearing as shown comprises a gear 164 which may be removably mounted on and fixed to the shaft 57 and interchanged with other gears of different diameters, the gear 164 meshing with an idler gear 165 which is supported on a shaft 166, the latter being carried by an arm 167, the latter being mounted to swing concentrically about the relatively fixed shaft 168 on which the gear 163 is mounted, so that the gear 165 may mesh with the gear 164 or with another gear of a larger or smaller size, the arm 167 being secured in adjusted position by a bolt 169 which cooperates with a relatively fixed segment 170.

The bag tube, after passing between the draw rolls, passes between the rotary cutter 20 and the cooperating cutter bar 21. The cutter 20 and cutter bar are fixed on the shafts 171 and 172 respectively and these shafts are connected by gears 173 and 174 so that they will revolve in unison and the cutter 20 will register with the cooperating bar 21 at each revolution. The cutter 20 preferably comprises a blade 20a (Fig. 25) which is serrated along its outer edge, and the cooperating bar 21 is grooved to receive this blade. As the cutter 20 and cooperating bar 21 come into cooperation, they sever the bag tube, the blade completely severing the upper side of the tube and the portions of the lower side of the tube at each side of the previously made cut d (Fig. 49). Since the lip cut d forms a tab which, during the passage of the bag tube between the cutters will not be under tension, this tab will not be cut off but will be merely pressed into the groove in the bar 21. The bag tube however, will be severed since it will be under tension when acted on by the blade 20a and cooperating bar 21, such tension being produced by the pinch rolls 22 and 23 between which the bag tube passes, these pinch rolls being driven at a higher surface speed than that of the draw rolls. As shown, the cutter shafts 171 and 172 are driven by a gear 175 which is fixed on the shaft 57.

Beyond the pinch rolls 22 and 23 are provided the pair of carrier rolls 24 and 25 the shafts of which are suitably journalled in the side frame members and connected by gears 176 and 177, and these rolls and the pinch rolls are driven at equal surface speed which is higher than the maximum speed at which the draw rolls are set to run, by a gear 178 which meshes with the gear 177 and the gear 179 secured to the shaft of the pinch roll 23. The gear 178 is driven by the gear 179 and by a gear 181, the latter being fixed to rotate with the gear 179 and meshing with a gear 182 which meshes with a gear 183 which latter meshes with a gear 184 fixed on the shaft 57. The pinch and carrier rolls advance the bag sections more rapidly after they have been severed from the bag tube, and any variation between the speed of the bag tube and the pinch rolls before the bag section is severed from the tube is compensated for by slippage between the tube and the pinch rolls.

The bag sections are delivered by the carrier rolls 24 and 25 to the pair of corrugating rolls 26 and 27 which form corrugations g in the bag sections which extend longitudinally downwardly from the mouths of the finished bags. The corrugating rolls are suitably journalled at each end in bearings 185 and 186, the bearings 185 for the upper roll being each movable vertically in guides and having a spring 187 beneath it which acts to lift it, and the upper roll is forced downwardly at suitable intervals into engagement with the passing bag sections by a rock shaft 188 (Fig. 24) having gear teeth 189 thereon which mesh with rack teeth formed on a plunger 190 (Fig. 23), the plunger having an adjusting screw 191 threaded therein and engaging the top of the respective bearing 185. A crank arm 192 is fixed to each end of the shaft 188 and carries a roller which rides on a suitably shaped cam 193 fixed on the shaft 194 of the upper opening roll 28.

The bag sections are delivered by the corrugating rolls to the pair of opening rolls 28 and 29 (Figs. 1, 3, 4, 5 and 28 to 36 inclusive). The shafts 194 and 195 of the upper and lower opening rolls are journalled in suitable bearings in the side members of the frame and these shafts are connected by gears 196 and 197 adjustably secured thereto by clamps 198 and 199 so that these rolls will revolve in opposite directions but at the same surface speed and will advance the bag sections between them. The upper roll 28, as shown in Fig. 32, comprises a central section 200 which is mounted loosely on the shaft 194 and a pair of end sections 201 which are keyed to said shaft so that the central and end sections are relatively rotatable, and bolts 202 which extend through segmental slots 203 in the respective end sections and are threaded into the central section serve to secure these sections in different relatively adjusted positions. The end sections have a bar 204 recessed in their peripheral portions, this bar extending longitudinally of this roll and through a segmental notch 205 in the middle section 200, this bar containing a shaft 206 which is mounted rotatably therein and carries a pair of pins 207 which are adapted to swing in slots 208 in the bar 204, so that these pins may project from the periphery of this roll and may be retracted within its periphery, by rotation of the shaft 206. A spring 209 is connected to one end of the shaft 206 and a crank arm 210 is connected to the other end of said shaft and carries a roller 211 which is held against a cam 212 by said spring, this cam being adjustably secured to the frame of the machine by a bracket 213, to which the cam is secured by a bolt 214 which passes through a segmental slot 215 in the cam. The bar 204 is provided with a longitudinal slot 216 through which the pins 207 may pass when it is desired to remove the shaft 206 from the bar 204, and the latter is secured in position in this roll by end rings 217 which are secured in place by screws 218. The upper opening roll 28 is provided in its periphery with sets of circumferentially extending slots 220, one set at each side of the center of this roll, and a pair of segmental slitting blades 221 are secured in the appropriate slots by screws 222 and one or more pins 223 as shown in detail in Fig. 36. In the making of bags of relatively small size, these slitting blades will be placed in the innermost slots 220 to conform with the size of the bag bottom, and in the making of bags of the larger sizes, these slitting blades will be placed in the outermost grooves, the intermediate grooves being provided to receive these blades when bags of intermediate sizes are being made. The slitting blades 221 are of such length and are so placed in the periphery of the upper opening roll that they will form the longitudinal slits e (Fig. 51) in the leading end of each bag section as it passes between this roll and the lower opening roll. The upper opening roll is also provided with a creaser blade 224 which forms the transverse crease h in the bag section (Fig. 51) along the line where the upper side of the tubular bag section is to be folded back when the leading end thereof is opened incident to the bottom forming operation. This creaser blade is fixed to a bar 225, the blade and bar being set in a notch formed in the middle section 200 of this roll, the ends of the creaser blade and bar extending across segmental recesses 226 in the end sections 201 and through notches 227 in the end rings 217. By rotating the rings 217 and the middle section 200 relatively to the end sections 201, the circumferential distance between the pins 207 and the creaser blade 224 may be adjusted to conform with bag bottoms of different sizes.

The lower opening roll 29 comprises a middle section 230 which is provided with circumferential grooves 231 to accommodate the pins 207 on the upper roll, and end sections 232 which are provided with sets of circumferential grooves 233 to accommodate the slitting blades 221 in the upper opening roll. The middle section 230 is loose or rotatable on the shaft 195 but the end sections 232 are keyed on said shaft so that the middle and end sections are relatively rotatable, and screws or bolts 234 extending through segmental slots in the ends of the end sections 232 and threaded into the middle section 230 serve to secure these sections in different relatively adjusted positions. Bars 235 are fixed in notches formed in the peripheries of the end sections 232, these bars extending in alinement longitudinally of this roll and providing bearings for a gripper shaft 236 the intermediate portion of which extends through a segmental slot 237 (Fig. 35) in the intermediate roll section 230. The shaft 236 has a pair of gripping fingers 238 bolted or otherwise secured thereon at each side of the middle roll section 230, the outer ends of these gripping fingers being arranged to cooperate with the adjacent peripheral portions of the bars 235, as shown in Fig. 29. A spring 239 is connected to one of the outer ends of the shaft 236 and acts thereon to swing the gripping fingers into clamping relation with the bars 235, and the other end of the shaft 236 has a crank arm 240 fixed thereon, this arm being provided with a roller 241 which rides on the periphery of a cam 242 under the influence of the spring 239, said cam being supported in fixed position by a bracket 243 which may be secured to one of the side frame members and secured to said cam by a screw 244 which extends through a segmental slot 245 in the cam. The middle section 230 of this roll is also provided with a notch in which a grooved creaser bar 246 is secured, this creaser bar extending across segmental recesses 247 in the peripheries of the end sections 232 and being held at its ends in notches 248 in a pair of rings 249 which are mounted rotatably on the end sections and are secured thereto by screws 250. By rotating the middle section 230 and the end rings 249 relatively to the end sections 232, the creaser bar 246 may be set at different circumferential distances from the gripping fingers 238 in this roll to conform with the adjustment of the creaser blade 224 in the upper roll.

The upper and lower rolls 28 and 29 and the controlling cams 212 and 242 are so timed that as each bag section enters between these rolls, the tab on the leading end thereof and at its lower side and which was formed by the thumb cut $d$ will enter beneath the gripping fingers 238 and the latter will immediately close thereon, as shown in Figs. 28 and 29, immediately following which the pins 207 in the upper roll will impale the upper side of the bag sections, and as the bag section advances, the pins 207 will pull the upper side of the bag section upwardly while the gripping fingers 238 pull the lower side of the bag section downwardly, thereby opening the leading end thereof preparatory to the bottom closing operation. Immediately following this operation and by the continued rotation of the opening rolls, the slitting blades 221 in the upper roll in cooperation with the grooves 233 in the lower roll will form the slits $e$ in the bag section, following which the creaser blade 224 and the companion grooved creaser bar 246 will engage the bag section and will crease it transversely on the line $h$ (Fig. 51), this crease facilitating the opening of the upper side of the bag section which is impaled by the pins 207. After the end of the bag section has been fully opened, the gripping fingers 238 are retracted by the cam 242 to release the grip on the lower side of the bag section and the pins 207 will be retracted by the cam 212 so that they will release the grip on the upper side of the bag section. The opening operation just described causes the end portions or flaps $k, k$ to be drawn inwardly and against the paste spots $c, c$ and $c', c'$, substantially as shown in Fig. 52.

The bag sections, after the bottoms or leading ends thereof have been thus opened by the opening rolls, pass downwardly between the lower opening roll 29 and a coacher roll 30 (Fig. 4), this coacher roll being mounted on a shaft 251 which may be driven by a gear 252 fixed thereto and meshing with a gear 253 secured on the shaft 195 of the lower opening roll. This coacher roll and also the opening rolls may be driven by a gear 254 fixed on the lower opening roll shaft 195, this gear meshing with a gear 255 which in turn meshes with and is driven from the gear 183 (Fig. 1). The bag sections as they pass from between the rolls 29 and 30, descend between pairs of vertical guide bars 256 and 257, the various rolls adjacent to these bars being grooved circumferentially to accommodate them, and the guide bars introduce the bag sections between the pasting rolls 31 and 32. The pasting roll 31, which is shown in detail in Figs. 37 to 40 inclusive, is formed in its periphery with a longitudinal recess 258 in which a paste pad 259 is secured, as by a screw 260, the outer periphery of this paste pad being knurled or grooved to facilitate the picking up of paste thereby. This paste roll is also formed with pairs of circumferential grooves 261 and 262 into one or the other pair of which are inserted paste rings 263 which are knurled or grooved on their outer surfaces to facilitate the picking up of paste thereby. When bags of the relatively larger sizes are being made, the paste rings are inserted in the outer grooves 261 as shown and are secured therein by pins 263ª the inner bevelled ends of which are clamped against the correspondingly bevelled flanges 264 of the respective paste rings by set screws 265 (Fig. 40), the guide rails 256 then operating in the other grooves 262; and in making bags of the relatively smaller sizes, the paste rings are fitted into the grooves 262 and are clamped therein by relatively longer pins 263, the guide rails 256 then operating in the other grooves 261. The paste pad 259 applies to the opened bag bottom as shown in Fig. 52, the area of paste $i$ and the paste rings 263 apply thereto the lines of paste $j$. The cooperating paste roll 32, as shown in Figs. 4 and 5, is provided with a longitudinal recess 259ª in its periphery which registers with the paste pad 259 in the roll 31, and the roll 32 is provided with circumferential grooves 266 to accommodate the guide rails 257 and with pairs of circumferential grooves 261ª and 262ª which are directly opposite to the grooves 261 and 262 in the roll 31 so that they will be directly opposite to the paste rings when placed in either of these pairs of grooves. As the opened bottom portion of the bag section passes between the rolls 31 and 32, the pad 259 applies the area of adhesive $i$ and the paste rings apply the strips of paste $j$. Since the recess 259ª in the roll 232 is directly opposite to the paste pad 259 and grooves 261ª or 262ª will be directly opposite to the paste rings, no paste will be applied to the face of the roll 32 in the event a bag section does not pass between the rolls 31 and 32 because of failure of feed or for other cause, thus avoiding the placing of paste on the roll 32 which would interfere with the proper passage of subsequent bag sections.

The paste rolls 31 and 32 may be driven in proper timed relation by gears 267 and 268 fixed on the shafts of these rolls and meshing with one another, the gear 268 being driven by a gear 269 which meshes with the gear 197 on the lower opening roll shaft 195. Paste is applied to the paste pad 259 and the paste rings 263 on the roll 31 by a roller 270 (Fig. 4) which receives paste from a paste fountain roll 271, this roll being immersed in a paste dish 272. The paste roller 270 is driven by a gear 273 fixed to its shaft and meshing with a gear 274, the latter being driven from the gear 267 fixed on the shaft of the roll 31. The fountain roll 271 is driven by a belt pulley 275 which is fixed on its shaft and over which travels a friction belt 276 (Fig. 48), which is driven from a relatively smaller pulley 277 fixed on the shaft 278 of the paste roll 31, a spring tensioned take-up roller 279 being provided for maintaining the belt under proper tension. A doctor roll 280 is mounted on the paste dish 272 to cooperate with the fountain roll 271 to break up lumps of paste, and the roll 280 has a rubbing action on the surface of the fountain roll 271 so that it will scrape excess paste therefrom. The doctor roll 280 is driven at a slower surface speed than that of the fountain roll 271 by a pair of gears 281 and 282 of appropriate sizes which are fixed to the respective shafts of these rolls. The driving means for the paste applying rolls will cause the fountain roll to be driven at relatively slow speed by the belt 276 and the paste roll 270 to be driven in such a direction that the side thereof which applies the paste to the paste pads and rings moves in the opposite direction to the direction of movement of the paste pads and rings, thereby causing the paste to be wiped by the roller 270 onto the paste pads and rings.

The bag sections, with the bottoms thereof still opened and pasted as shown in Fig. 52, after passing between the paste rolls 31 and 32, are directed by the guide rails 256 and 257 between the pair of carrier rolls 33 and 34 (Fig. 4). These carrier rolls are journalled in suitable bearings in the side frame members of the machine and their shafts are connected by gears 285, and these rolls are driven by a gear 286, this gear in turn being driven from the gear 268 on the shaft of the paste roll 32. These carrier rolls are provided with circumferential grooves to accommodate the guide rails 256 and 257. The carrier rolls advance the bag sections to the creasers 35 and 36 (Figs. 3, 4, 5 and 41 to 47 inclusive). The creaser 35 comprises a shaft 287 journalled in suitable bearings in the side frame members, pairs of arms 288 and 289 adjustably secured on the shaft 287 by clamps 290 and 291, and creaser bars 292 and 293 which are secured to the respective pairs of arms 288 and 289 and are adjustable radially thereof by screws 294 and 295. By this arrangement, the creaser bars are adjustable into different angular positions about the shaft 287 and the circumferential distance between the creaser blades may be varied to conform with bag bottoms of different sizes. The shaft 287 also has a pair of guide segments 296 adjustably secured to it in positions opposite the creaser blades for guiding the bag sections as they pass between the creasers, and this shaft also has a pair of chain guides 297 mounted revolubly thereon to cooperate with a folding chain which is hereafter described.

The creaser 36 comprises a cylinder which embodies a middle section 298 which is mounted loosely on the shaft 104 and end sections 299 which are keyed or otherwise fixed to said shaft, and a pair of screws 300 extend through segmental slots 301 in the respective end sections and are threaded into the middle section and serve to clamp the middle and end sections of this roll in fixed relation although permitting relative rotation of the middle section when these screws are loosened. The middle section 298 has a bar 302 fixed therein, this bar extending longitudinally of the cylinder or roll and having a shaft 303 mounted rotatably therein, and this shaft has a gripper 304 formed thereon which extends through the greater portion of the length of this creaser roll and is provided with a suitable number of spring plungers 305 which tend to move its outer edge into engagement with a cooperative gripper blade 306 located in the bar 302 immediately adjacent to the periphery of the creaser roll. The ends of the bar 302 are adjustable in a direction circumferentially of this roll in segmental recesses 307. The end sections 299 have notches in their peripheries in which is fixed a bar 308 similar to the bar 302, this bar 308 having a shaft 309 mounted rotatably therein and formed with a gripper 310 which extends the length of the periphery of this creaser roll and is acted on by a suitable number of spring plungers 311 which tend to move it into cooperation with a gripper blade 312 located near the periphery of this roll and extending throughout the length thereof. The bar 308 extends across a segmental recess 313 in the middle roll section 298 to permit relative rotation between this roll section and the end sections. The gripper bars 302 and 308 are relatively adjusted in a direction circumferentially of this creaser roll to bring the openings in the grippers into register with the creaser blades 292 and 293 on the creaser 35, the circumferential distance between these grippers being made to conform with that of the gripper blades 292 and 293, according to the size of the bottom of the bag being made, and these creaser blades and cooperating grippers serve to crease the bag bottom on the lines $m$ and $m'$ on which the bottom flaps $n$ and $n'$ (Fig. 52) are to be folded.

Means is provided for holding the gripper 310 open until the bag bottom has been forced between it and the gripper blade 312 by the creaser blade 292 and thereupon releasing this gripper so that it may nip the portion of the bag thus introduced, thereby forming the crease $m$, and for holding the gripper 304 open until the bag has been introduced between it and the cooperative gripper blade 306 by the creaser blade 293 and thereupon releasing this gripper so that it may close and thereby crease the bag on the line $m'$. As shown, the gripper shaft 309 has a crank arm 314 clamped or otherwise fixed thereto, by a crank arm carrying a roller 315 which cooperates with a suitably shaped cam 316, this cam being mounted loosely around the shaft 104 and supported by a bracket 317 bolted or otherwise secured to a cross member 318 secured to the side frame members, and the shaft 303 has a crank arm 319 clamped or otherwise fixed to it, this crank arm carrying a roller 320 which rides on a suitably shaped cam 321 which extends around the shaft 104 and adjustably supported in fixed position by a bracket 322 bolted to the cross member 318. The cams 316 and 321 are so shaped and set that the gripper 304 which cooperates with the creaser blade 294 which nips the bag bottom on the line $m'$ for the folding of the flap $n'$ releases its grip on the bag before the gripper 310 which grips the bag on the line $m$ for the folding of the bottom flap $n$ releases its grip. Creases 35 and 36 are driven in unison by connecting gears 334 and 334ª meshing with gear 286.

The gripping of the bag bottom by these grippers attaches the bag to the creaser roll 36 so that the bag will be carried around with this roll, during which the closing and sealing of the bottom flaps $n$ and $n'$ takes place. The means provided for closing the bottom flaps comprises a pair of endless chains 325 (Figs. 4 and 5) which travel continuously over pairs of sprocket wheels 326 and 327 and over the chain guides 297 on the shaft 287 and beneath a pair of segmental guides 316ª and 321ª concentric with the creaser roll 36 and fixed to the respective cams 316 and 321, and around a pair of rollers 328, the latter being mounted revolubly on shafts 329 which are adjustable in segmental slots 330 which are concentric with the creaser roll 36. The chains 325 are driven at twice the peripheral speed of the creasers 35 and 36 by the sprocket wheels 326 the shaft 331 of which has a gear 332 fixed thereon which is driven through an idler gear 333 from the gear 334 fixed on the creaser shaft 287. A pair of folding rolls 335 extend across and connect the chains 325, and as these rolls are carried into close proximity with the creaser roll 36 by the chain guides 297 on the shaft 287, they overtake the flap $n'$ which has been creased along the line $m'$ and fold this flap against the bag bottom so that it will be pasted thereto by the paste lines $j$. Cooperating with the creaser roll 36 beyond the chain is a folder for the bottom flap $n$, this folder comprising a shaft 336 which is mounted in suitable bearings in the machine and is driven by a gear 337 fixed thereon and meshing with a gear 338 fixed on the creaser roll shaft 104. The shaft 336 has a suitable number of circular flap folding disks 339 fixed thereon which cooperate with the periphery of the creaser roll 36, and as the bag bottom passes between the folding disks 339 and the creaser roll 36, the outwardly projecting flap $n$, which has been creased on the line $m$, will be folded against the previously folded flap $n'$, thereby causing it to be pasted thereto by the paste lines $i$ and $j$. The creaser roll 36 is formed with circumferential grooves 340 in which a pair of doffers 340ª operate, these doffers serving to strip or remove the completed bag from the creaser roll 36. A pair of auxiliary doffers 341 are also pivotally suspended from the relatively fixed doffers 340, by the pivots 342, these pivoted doffers carrying weights 343 which yieldingly hold them into close relation with the bags as they pass around the folding disks 339 whereby the finished bags are delivered onto the belt 37 which conveys them from the machine.

The various parts of the machine are driven from the main drive shaft 60 which is preferably provided with a hand wheel 345 to facilitate adjustment of the machine by manual operation, the machine being driven during its operation preferably by an electric motor 346 which may be mounted on the machine and connected by a belt 347 to a pulley 348 on the shaft 349, the latter being connected by a silent chain or the like 350 to the main shaft 60. In order to facilitate manual operation of the machine, the chain 350 is connected to the main shaft 60 by a roller or overrunning clutch which is shown in detail in Figs. 26 and 27. This clutch comprises an outer member 351 to which the sprocket 352 for the chain is fixed, and an inner member 353 which is keyed or otherwise fixed on the shaft 60, the outer member 351 being rotatably mounted on the inner member by ball or other antifriction bearings 354. The inner member has a circular ring 355 fixed to it and the outer member has a ring 356 fixed to it and surrounding the ring 355, the ring 356 being formed with recesses 357 in its inner circumference the outer walls 358 of which converge toward the periphery of the ring 355. Rollers 359 are mounted in these recesses, and spring plungers 360 act on the rollers and tend to move them toward the constricted ends of the recesses 357. Assuming that the chain 350, in operating the machine, drives the sprocket wheel 352 in an anti-clockwise direction in Fig. 27, the rollers 359 will tend to move toward the constricted ends of the recesses 357 and thereby become wedged between the inner and outer members 355 and 356, thus forming a driving connection between them. However, when the machine is stopped and it is desired to operate it manually as by the hand wheel 345, turning of the hand wheel to rotate the shaft 60 in an anti-clockwise direction in Fig. 27 will move the rollers 359, against the action of the spring plungers 360, toward the wider ends of the recesses 357, thereby causing these rollers to release themselves from the inner ring 355, and the shaft 60 may then be turned easily by the hand wheel since the driving motor and its connections to the main shaft 60 will remain idle.

In making bags according to the present invention, paste from the two paste spots $c, c$ applied to the web in the regions thereof which will lie at the ends of the slits produced in one side of the bag tube in forming the bag bottom is transferred, when the tube is formed, and its sides compressed by the roller 160, to the regions of the other side of the tube to provide the paste spots $c', c'$ which will lie at the ends of the slits produced in that side of the bag tube, and when the leading end of the bag section is opened preparatory to the forming of the bag bottom, the bottom flaps $k, k$ which are drawn inwardly by the opening operation, are superposed on the paste spots $c, c'$, and they become firmly pasted to the flaps $n$ and $n'$ when these flaps are pressed together during their passage between the pasting rolls 31 and 32, the carrier rolls 33 and 34, the rods 335 on the chain 325 which roll over the folded flap $n'$ and the creaser roll 36 and folding disks 339. The paste spots thus applied to the bag bottom effectively seal the bottom flaps $k, k$ and $n, n'$ and render the bag bottom sift-proof and, since the flaps $k, k$ are pasted to the flaps $n, n'$ at the terminals of the slits $e, e$, tearing of the bag bottom beyond the inner ends of these slits is effectively prevented, thereby increasing the strength of the bag bottom. While the paste spots are preferably applied to the web before it is formed into a tube, these paste spots may be applied at any other stage before the tube is completely formed or before the longitudinal seam is pasted down.

The paste spot applying pads provided by the present invention afford simple but effective means for this purpose, only a pair of these pads being required, and as the paste pads are adjustable toward and from one another on their shaft, they may be easily and quickly adjusted to conform with the transverse spacing of the slits as made by the slitters for bag bottoms of different sizes. The throw-out means provided for these paste pads enables them to be easily and quickly thrown out of operative relation with their cooperative paste supply roll and the web, thus enabling the machine to be adjusted without applying paste spots to the web. By driving the paste spot applying pads at a greater speed than the surface speed of the paste supply roll, the paste is effectively wiped therefrom, and by knurling or grooving the paste receiving surfaces of the pads, their capacity for holding paste is increased, thereby insuring the application of a sufficient amount of paste to the web from these pads for the transfer of an ample amount therefrom to the other side of the tube when the same is formed from the web.

The lip cutter operates efficiently to cut the tab at the bottom and the thumb hole which provides an opening lip at the mouth of the bag. The substantially radial adjustment of the lip cutter on its shaft enables it to be easily adjusted to travel at the same speed at which the web travels when the change gear of the machine is set to feed the web at a higher or lower speed for the making of bags of larger or smaller sizes, and the graduated scale provided on the lip cutter enables it to be adjusted quickly and accurately. The driving gearing for the lip cutter enables the lip cutter to be driven from its driving means irrespective of the different positions in which its shaft may be set. The rubber faced roll against which the lip cutter operates provides an effective backing for the web while being cut, and by mounting this roll on its shaft so that it may be shifted longitudinally thereon, different portions of this roll may be brought opposite to the lip cutter for cooperation therewith after other portions have been cut and impaired by the lip cutter.

The rotary cutters which sever the bag tube into bag sections operate efficiently to sever the upper and lower walls of the bag tube not cut by the lip cutter, the tab formed by the lip cutter being unsevered by these cutters since this tab will not be under tension as are the other portions of the bag tube, as the latter passes between the cutters.

The throw-out means for the longitudinal seam paste roll enables this roll to be easily and quickly removed from operative relation with the web whenever desired, as while the machine is being adjusted, this roll, when in operation, being held in working relation with the web by gravity so that an even pressure is maintained thereon.

By mounting the slitter blades interchangeably in the grooves in the upper opening roll, they are caused to slit bag bottoms of different sizes at the proper points to effectively form the bottom flaps.

The paste pad and rings which apply the paste to the bottom flaps may be readily adjusted to accommodate them to bag bottoms of different dimensions, and they operate opposite to a recess and grooves in the cooperative paste roll, so that the proper degree of pressure is applied to the bag bottom to effectively transfer the paste thereto, and if a bag does not pass between the paste rolls when the paste pad and rings reach their operative position, no paste will be applied by the paste pad and rings to the surface of the cooperating paste roll.

By mounting the creaser blades and grippers in the opening rolls and creasers so that they are relatively adjustable circumferentially, they are adapted to operate effectively on bags of different sizes.

The roller clutch drive for the machine enables it to be easily operated manually, as occasionally becomes necessary for the purpose of adjusting the machine, by turning the hand wheel, without the necessity of overcoming the resistance offered by the driving motor and its driving connections with the machine.

I claim as my invention:

1. The method of making bags which comprises applying spots of adhesive to adjacent areas of a sheet, folding the opposite margins of the sheet onto the portion thereof bearing the adhesive spots and thereby transferring adhesive from said spots to the folded portions of the sheet, separating the portions of the sheet to which the adhesive is thus transferred from the portions of the sheet to which the spots of adhesive were applied, and folding end portions of the sheet onto the adhesive spots thus applied and transferred.

2. The improvement in the method of making bags by forming a web of material into a tube and folding an end thereof to provide overlapping bottom closing flaps, which comprises applying, before the tube is completely formed, spots of adhesive to areas of the material which are to constitute overlapping portions of the bottom closing flaps, forming the web into a tube, transferring adhesive from said spots to other areas of the web which are to form bottom closing flaps, separating the spots of adhesive thus applied and transferred and opening the end of the tube, and then closing the bottom flaps and sealing overlapping portions thereof by said applied and transferred spots of adhesive.

3. The method of making bags which comprises applying paste spots to an area of a sheet which is to form one side of the bag, folding the sheet into a tube and pressing together the opposite sides thereof to cause paste from the spots on one side to be transferred to the other side thereof, opening an end of the tube and separating the paste spots on the opposite sides of the tube, and folding end portions of the tube against the paste spots thus applied and transferred to the respective sides of the tube.

4. The method of making bags which comprises applying paste spots to areas of a travelling web which will lie on one side of a bag made therefrom, folding the web into a tube and pressing together the sides thereof to cause paste to be transferred from said spots on one side of the tube to the other side thereof, slitting an end of the tube to points adjacent to the paste spots on the sides thereof, opening the slit end of the tube and separating the paste spots thus provided on the opposite sides of the tube, and folding end portions of the tube inwardly against the paste spots on the sides thereof.

5. The method of making bags which comprises applying paste spots to a travelling web on adjacent areas intermediately of the longitudinal edges thereof, folding the longitudinal edges of the web upon the intermediate portion thereof and upon the paste spots thereon, thereby forming a tube and producing paste spots on the opposite folded portions of the tube by transfer from the first mentioned paste spots, slitting longitudinally both sides of the tube at one end thereof to points in alinement with said paste spots, opening the slit end of the tube and separating the paste spots on the opposite sides of the tube, folding end portions of the tube against the paste spots on both sides of the tube, applying adhesive to the outer sides of said folded end portions, folding other end portions of the tube against said folded end portions of the tube, and applying pressure to the last folded end portions.

6. In a bag machine having a member over which a web is arranged to travel, a longitudinal seam paste roll to cooperate with the portion of the web travelling over said member, a paste dish supporting said roll and for supplying paste thereto, a rotatable shaft along which the paste dish is adjustable and supporting said roll and dish to swing toward and from said member about an axis parallel to the axis of said paste roll, said roll normally resting by gravity against the web to apply paste thereto, and means for rotating said shaft to lift the roll and dish about said axis into inoperative relation with the web.

7. In a bag machine, the combination of guiding means over which a web is movable, a shaft carrying a pair of axially spaced pads for applying spots of paste to the web, a roll adjacent to but spaced laterally from said guiding means for supplying paste to said pads, said shaft being movable in a path directed between said guiding means and roll for throwing said pads into and out of cooperation therewith, springs acting on said shaft to throw said pads out of cooperation with said guiding means and roll, and a cam shaft having cams thereon cooperative with the ends of said pad carrying shaft for throwing the pads into cooperation with said guiding means and roll.

8. In a bag machine, the combination with a former for folding the longitudinal edges of a web to form it into a bag tube, of a freely revoluble guide roller located in advance of the former and over which the web is movable, a paste supply roll, a shaft mounted parallel to said paste supply roll, a pair of paste applying pads mounted on said shaft and adjustable axially thereof in the direction of the width of the web, said pads being rotatable in a circle to contact with said paste supply roll and the portion of the web moving over said guide roller and operative to apply spots of paste to the portion of the web which subsequently forms one side of the bag tube, and means for slitting the tube to points adjacent to said spots of paste and in accordance with the spacing thereof laterally of the tube.

9. In a bag machine, the combination of guiding means over which a web is movable, a paste supply roll, a pair of paste applying pads mounted to rotate in a circle and having knurled surfaces to contact with the roll and the portion of the web moving over the guide, and driving means for said pads and roll embodying means for revolving the said roll at a lower surface speed than that of the pads.

10. In a bag machine, the combination of a roller over which a web is movable, means including a pair of paste pads cooperative with one side of said roller for applying pairs of spots of paste to the web at intervals longitudinally thereof, a cutter cooperative with another side of said roller for cutting tabs from the web at longitudinal intervals with the ends of the cuts adjacent to the respective pairs of paste spots, means for forming the web into a tube, and means for slitting the tube at opposite sides of the tabs and to points adjacent to the spots of paste from the web.

11. In a bag machine, the combination of a shaft, a rubber covered roller mounted revolubly thereon for the travel of a web thereover, a cutter cooperative with said roller for cutting a tab from the web, means for driving the cutter from said shaft, said roller being adjustable to different positions axially of said shaft to bring different portions into cooperation with the cutter, and adjustable means on said shaft cooperative with the ends of said roller for maintaining the latter in different adjustments axially thereof.

12. In a bag machine, the combination of a roller over which a web is arranged to travel, a shaft mounted parallel to and adjustable toward and from said roller, a cutter carried by and adjustable to different distances from the axis of said shaft to conform with different distances of said shaft from the roller and operative upon the portion of the web travelling over said roller to cut tabs therefrom, and paste pads cooperative with the portion of the web travelling over said roller for applying paste spots thereto adjacent to the ends of the cuts made in cutting the tabs therefrom.

13. In a bag machine, the combination of a roller over which a web is arranged to travel, a shaft on which said roller is supported rotatably, a shaft mounted parallel to and adjustable toward and from said roller, a cutter carried by said adjustable shaft and cooperative with the roller to transversely cut the portion of the web travelling over it, the cutter being adjustable substantially radially of said adjustable shaft to bring it into cooperation with the web when the distance of said adjustable shaft from the roller is varied, and driving gears on said shafts and a pair of adjustable intermediate gears meshing with one another and meshing respectively with the gears on said shafts for maintaining said adjustable shaft in driving relation with said roller supporting shaft.

14. In a bag machine, the combination of a roller over which a web is arranged to travel, means cooperative with the web as it travels over said roller to cut a tab therefrom, means cooperative with the web as it travels over said roller to apply spots of paste thereto at points adjacent to the tab, means for forming the web into a bag tube, cooperative cutter members between which the tube passes, said members being operative to sever the tube on a line which joins the ends of the tab, and means for cutting in an end of the tube slits which extend to points adjacent to the paste spots.

15. In a bag machine having means for drawing and guiding a web, the combination of a guide over which the web travels, means for applying spots of paste at bag length intervals to the upper side of the web passing over said guide and to the intermediate portion of the web between its longitudinal edges which is to form one side of a bag tube, a former beneath which the web passes for folding the longitudinal portions of the web over onto the intermediate portion of its width to form a bag tube having said paste spots on the inner surface of one side thereof, means located beyond the former for pressing the sides of the tube together to transfer paste from said paste spots on one side to the other side of the tube to provide paste spots thereon, means for severing the bag tube at intervals adjacent to said paste spots to form bag sections, and means located beyond said severing means for slitting the end of each bag section longitudinally at both sides thereof to points adjacent to said paste spots.

16. In a bag machine having means for drawing and guiding a web, the combination of a guide over which the web travels, means for applying spots of paste at bag length intervals to the upper side of the web passing over said guide and to the intermediate portion of the web between its longitudinal edges which is to form one side of a bag tube, a former beneath which the web passes for folding the longitudinal portions of the web over onto the intermediate portion of its width to form a bag tube having said paste spots on the inner surface of one side thereof means located beyond the former for pressing the sides of the tube together to transfer paste from said paste spots on one side to the other side of the tube to provide paste spots thereon, means for severing the bag tube at intervals adjacent to said paste spots to form bag sections, means located beyond said severing means for longitudinally slitting the end of each bag section to points adjacent to said paste spots, and means located beyond said slitting means for opening the slit ends of the bag sections to separate the paste spots applied to one side of the bag sections from the paste spots transferred to the other side thereof and for folding end portions of the bag section onto said paste spots.

17. In a bag machine having means for drawing and guiding a web, the combination of a guide over which the web travels, means for applying spots of paste at bag length intervals to the upper side of the web passing over said guide and to the intermediate portion of the web between its longitudinal edges which is to form one side of a bag tube, a former beneath which the web passes for folding the longitudinal portions of the web over onto the intermediate portion of its width to form a bag tube having said paste spots on the inner surface of one side thereof, means located beyond the former for pressing the sides of the tube together to transfer paste from said paste spots on one side to the other side of the tube to provide paste spots thereon, means for severing the bag tube at intervals adjacent to said paste spots to form bag sections, means located beyond said severing means for longitudinally slitting the end of each bag section to points adjacent to said paste spots, and opening rolls located beyond said slitting means operative upon the slit end of each bag section to spread apart the slit portions thereof and to separate the paste spots applied to one side of the bag section from the paste spots transferred to the other side thereof and to press end portions of the bag onto the paste spots at the ends of the slits.

18. In a bag machine having means for drawing and guiding a web, the combination of a guide over which the web travels, means for applying spots of paste at bag length intervals to the upper side of the web passing over said guide and to the intermediate portion of the web between its longitudinal edges which is to form one side of a bag tube, a former beneath which the web passes for folding the longitudinal portions of the web over onto the intermediate portion of its width to form a bag tube having said paste spots on the inner surface of one side thereof, means located beyond the former for pressing the sides of the tube together to transfer paste from said paste spots on one side to the other side of the tube to provide paste spots thereon, means for severing the bag tube at intervals adjacent to said paste spots to form bag sections, means located beyond said severing means for longitudinally slitting the end of each bag section to points adjacent to said paste spots, opening rolls located beyond said slitting means and operative upon the slit end of each bag section to spread apart the slit portions thereof and to separate the paste spots applied to one side of each bag section from the paste spots transferred to the other side thereof and to press end portions of the bag onto the paste spots at the ends of the slits, and a pair of cooperative paster rolls between which the bag sections are guided to pass, one of said paster rolls having paste applying elements thereon for applying paste to the folded end portions of the bag sections and the other paster roll having recessed portions arranged to register with said elements.

19. In a bag machine having means for drawing and guiding a web, the combination of a guide over which the web travels, means for applying spots of paste at bag length intervals to the upper side of the web passing over said guide and to the intermediate portion of the width of the web between its longitudinal edges which is to form one side of a bag tube, a former beneath which the web passes for folding the longitudinal portions of the web over onto the intermediate portion of its width to form a bag tube having said paste spots on the inner surface of one side thereof, means located beyond the former for pressing the sides of the tube together to transfer paste from said paste spots on one side to the other side of the tube to provide paste spots thereon, means for severing the bag tube at intervals adjacent to said paste spots to form bag sections, means located beyond said severing means for longitudinally slitting the end of each bag section to points adjacent to said paste spots, means located beyond said slitting means for opening the slit ends of the bag sections and separating the paste spots applied to one side of each bag section from the paste spots transferred to the other side thereof and for folding end portions of each bag section against said paste spots, means for applying adhesive to said folded end portions, and means for creasing side portions of each bag section and folding them onto the folded end portions thereof.

20. In a bag machine having mechanism for drawing a web and forming it into a bag tube, mechanism for severing the tube into bag sections, mechanism for forming bag bottoms on the bag sections, and means including a main drive shaft for driving said mechanisms, power means for driving said main shaft, a hand wheel for turning said main shaft manually, and an over-running clutch interposed between said power means and main drive shaft and operative automatically by said power means to drive the main shaft and operative automatically to disconnect the main shaft from the power means and free said shaft for forward rotation when said shaft is turned forwardly manually.

TRUE M. AVERY.